United States Patent
Vargas et al.

(10) Patent No.: US 11,050,782 B2
(45) Date of Patent: *Jun. 29, 2021

(54) SYSTEMS AND METHODS FOR PROVIDING SECURITY TO AN INTEGRATED CIRCUIT IN AN ENDPOINT DEVICE USING A DYNAMIC SECURITY ARCHITECTURE ENVIRONMENT (DSAE)

(71) Applicant: Security Together Corporation, Roseville, CA (US)

(72) Inventors: Anthony Joseph Vargas, Roseville, CA (US); Christopher Robert Sharpe, San Jose, CA (US)

(73) Assignee: SECURITY TOGETHER CORPORATION, Roseville, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/537,708

(22) Filed: Aug. 12, 2019

(65) Prior Publication Data

US 2019/0364071 A1 Nov. 28, 2019

Related U.S. Application Data

(63) Continuation-in-part of application No. 15/958,829, filed on Apr. 20, 2018, now Pat. No. 10,380,335, which is a continuation-in-part of application No. 15/913,259, filed on Mar. 6, 2018, now Pat. No. 10,216,924, which is a continuation-in-part of application No. 14/800,579, filed on Jul. 15, 2015, now Pat. No. 9,928,359.

(51) Int. Cl.
*H04L 29/06* (2006.01)
*G06F 21/78* (2013.01)
(Continued)

(52) U.S. Cl.
CPC .......... *H04L 63/1441* (2013.01); *G06F 21/42* (2013.01); *G06F 21/50* (2013.01);
(Continued)

(58) Field of Classification Search
None
See application file for complete search history.

(56) References Cited

U.S. PATENT DOCUMENTS 5,892,900 A 4/1999 Ginter
5,918,194 A 6/1999 Banaska
(Continued)

*Primary Examiner* — Andrew J Steinle
(74) *Attorney, Agent, or Firm* — Inventive Law Inc.; Jim H. Salter

(57) ABSTRACT

Systems and methods for providing security to an integrated circuit/processor and the processor cores in an endpoint device using a dynamic security architecture environment (DSAE) are disclosed. A security system is configured to provide security to a host endpoint device, the security system comprising: a processing unit including an Operational Processing Unit (OPU), an Input Processing Unit (IPU), and an Execution Processing Unit (EPU); logic modules in communication with the processing unit, the logic modules including an Input System, an Operational System, and an Execution System; and a host interface being configured to enable the Input System, the Operational System, and the Execution System to be coupled for data and control transmissions therebetween and coupled for data and control transmissions between the processing unit and a physical Processor Packing Unit (PPU) including at least one processor core, the PPU being configured to use different processor instruction sets, the Input System, the Operational System, and the Execution System being configured to present a different attack surface at different intervals within a period of time for the PPU, each different attack surface corresponding to the PPU executing a different processor instruction set, the processing unit, the logic modules, and the host interface being integrated together with the PPU on an integrated circuit of the host endpoint device.

36 Claims, 15 Drawing Sheets

(51) Int. Cl.
*G06F 21/71* (2013.01)
*G06F 21/50* (2013.01)
*G06F 21/42* (2013.01)

(52) U.S. Cl.
CPC .............. *G06F 21/71* (2013.01); *G06F 21/78* (2013.01); *H04L 63/1425* (2013.01)

(56) References Cited

U.S. PATENT DOCUMENTS

| | | |
|---|---|---|
| 6,597,255 B1 | 7/2003 | Turton |
| 7,890,925 B1 | 2/2011 | Wyatt |
| 8,904,188 B2 | 12/2014 | Maheshwari |
| 9,928,359 B1 | 3/2018 | Vargas |
| 10,216,924 B1 | 2/2019 | Vargas |
| 10,380,335 B1 | 8/2019 | Vargas |
| 2004/0184610 A1 | 9/2004 | Campbell |
| 2007/0174400 A1 | 7/2007 | Cai |
| 2007/0291767 A1 | 12/2007 | Smith |
| 2008/0126260 A1* | 5/2008 | Cox .................... H04L 63/0861 705/67 |
| 2010/0310068 A1 | 12/2010 | Fischer |
| 2011/0271112 A1 | 11/2011 | Bajko |
| 2011/0302646 A1 | 12/2011 | Ronda |
| 2013/0283296 A1 | 10/2013 | Brown |
| 2014/0211816 A1 | 7/2014 | Ekner |
| 2014/0325239 A1 | 10/2014 | Ghose |
| 2016/0065612 A1* | 3/2016 | Evans ..................... G06F 9/441 726/22 |
| 2016/0232358 A1 | 8/2016 | Grieco |

\* cited by examiner

SYSTEMS AND METHODS FOR PROVIDING SECURITY TO AN INTEGRATED CIRCUIT IN AN ENDPOINT DEVICE USING A DYNAMIC SECURITY ARCHITECTURE ENVIRONMENT (DSAE)

PRIORITY PATENT APPLICATIONS

This is a non-provisional continuation-in-part (CIP) patent application claiming priority to U.S. patent application Ser. No. 15/958,829, filed Apr. 20, 2018, to be U.S. patent Ser. No. 10/380,335; which is a non-provisional continuation-in-part (CIP) patent application claiming priority to U.S. patent application Ser. No. 15/913,259, filed Mar. 6, 2018, now U.S. patent Ser. No. 10/216,924; which is a non-provisional continuation-in-part (CIP) patent application claiming priority to U.S. patent application Ser. No. 14/800,579, filed Jul. 15, 2015, now U.S. Pat. No. 9,928,359. This non-provisional CIP patent application claims priority to the referenced patent applications and patents. The entire disclosure of the referenced patent applications and patents is considered part of the disclosure of the present application and is hereby incorporated by reference herein in its entirety.

TECHNICAL FIELD

The disclosed subject matter relates to the field of computing systems, data processors, multi-processor systems, operating systems, integrated circuits, and data security systems, and particularly although not exclusively, to improved security architectures, integrated circuits, systems, and methods based upon multiple processors, multiple processor architectures, operating systems, communication channels, and power distribution to implement a dynamic security architecture environment (DSAE) on an integrated circuit/system on a chip/processor.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2019, Security Together Corporation; All Rights Reserved.

BACKGROUND

Today's current electronic system architectures, including integrated circuits, have inherent deficiencies that make defending against cyber attacks or other malicious attacks extremely difficult and many times impossible. Current electronic architectures and integrated circuits are limited in how they can deal with an ever changing array of attacks. Companies focus on making networks or electronic devices more secure. Unfortunately, this strategy can only go so far as the platforms and architectures that these networks and electronic devices rely on are insecure.

SUMMARY

Described are architectures, systems, processes and methods for security that, at their core, are adaptive and changing at determined intervals so as to present a different environment, a portion of which is a varied attack surface, to the communications world exterior to the system. As such, the example embodiments disclosed herein are systems and methods for providing security to an integrated circuit in an endpoint device using a dynamic security architecture environment (DSAE).

In one aspect is described improved security architecture, systems, processes and methods for security are provided to create a security system that integrates with a host endpoint device, wherein the security system protects the host endpoint device from cyber attacks or other malicious attacks targeted against the host endpoint device. The host endpoint device or host device is also denoted herein as an endpoint. The example embodiments described herein provide details for implementing a DSAE security architecture (denoted herein as the security system) internally with an integrated circuit or chip of an endpoint device, such as a computer, laptop, tablet, phone, vehicle, medical device, Industrial Control System (ICS), or other electronic or Internet connected device. The example embodiments described herein also provide details for implementing the DSAE security architecture in an integrated circuit or chip of an endpoint device to make the host endpoint device more secure by enabling the security system to combat cyber attacks or other malicious attacks targeted toward the host device. The example embodiments described herein also provide details for creating a security system that leverages the DSAE architecture, wherein the security system is configured to integrate with an integrated circuit or processor of a host endpoint device for physical communication with the host endpoint device and logic communication via software or other executable logic between the host device and the security system to make the host endpoint device more secure.

In another aspect, the described architectures, system and methods based upon multiple processors, operating systems and communication channels, in which at least some processors each perform as an input system connectable to a network, and are dissimilar in some manner, the manner of dissimilarity being controlled by a control system that is not connected to the network. Additionally in this aspect, an execution system is included which performs execution based upon received inputs to the input system, which are passed to the execution system once validated as being safe and not security compromised.

In another aspect, the described security system keeps a continuous track of network activity and identifies a level of risk associated with various actions. The awareness of the risk for the user helps drive security accountability throughout an organization or individual, thus making an organization or individual more secure.

In another aspect, a multi-channel internal bus that includes parallel communication lines, and which in a preferred embodiment can include messaging that is hashed and converted into optical signals, also exists to provide an even more secure environment.

Many security flaws that lead to security compromises are historically caused by homogeneous systems and processors. One of the core principles of the DSAE security architecture as disclosed herein is that of a security architecture that is a heterogeneous system of different processor architectures, different operating systems and applications that makes it extremely difficult for cyber attacks to succeed. This patent disclosure extends the DSAE security architecture to include optimizations, which allow the DSAE security architecture to work at the circuit and/or processor level.

In addition, this patent disclosure contains example embodiments, which may not be optimal implementations of the DSAE security architecture, yet are included for security reasons and so that the DSAE security architecture gets implemented in a way that is truly secure. Some particular embodiments in this patent disclosure are specifically designed so that the DSAE architecture is not implemented in a way that is insecure.

A main concept introduced in the DSAE processor patent disclosure provided herein includes the importance of power channels and processors and the processor cores, which allow and provide the functionality of availability in the DSAE security architecture processor implementation as disclosed herein. Independent power channels to each core are preferred embodiments, as individual power to each core provides higher levels of availability (availability is a key, yet often overlooked, component of security.) These features are not provided in conventional processors. Additionally, the disclosure provided herein also describes systems and methods for emulating and/or virtualizing the DSAE security architecture in a circuit/processor and the processor cores. However, the emulation and/or virtualization of the DSAE security architecture in a processor may not be an optimal embodiment of the DSAE architecture. As disclosed herein, the use of different processor instruction sets, different system architectures, different power distribution, and the capability for emulation and virtualization of the DSAE security architecture in a processor are the main additions provided in this patent disclosure. These features expand this patent disclosure from the other DSAE patent disclosures and differentiate from any conventional technologies. The details of the various example embodiments disclosed herein are provided below and in the accompanying drawings.

The DSAE security architecture and the DSAE circuit (also referred to as processor) disclosed herein can include the use of a virtual processing unit. A virtual processing unit is a processor core that is not directly assigned to a DSAE logical system at that time. A virtual processing unit is a spare hardware unit with software running on it that can become an IPU, UPU, EPU or OPU as needed. The concept of a virtual processing unit is similar to a spare disk in various RAID configurations. A virtual processing unit is a processor core plus software that logically keeps track of the other DSAE systems through a heartbeat in a passive way and can become an active DSAE IPU, UPU, EPU or OPU along with being assigned to the corresponding DSAE logical system (Input System, User System, Execution System or Operational System) should another processing unit core or the software in one of the DSAE logical systems malfunction. The virtual processing unit can be actively assigned into the DSAE logical system and become a processing unit. The independent, isolated nature of the DSAE system allows for this new concept.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION

Figure 1:
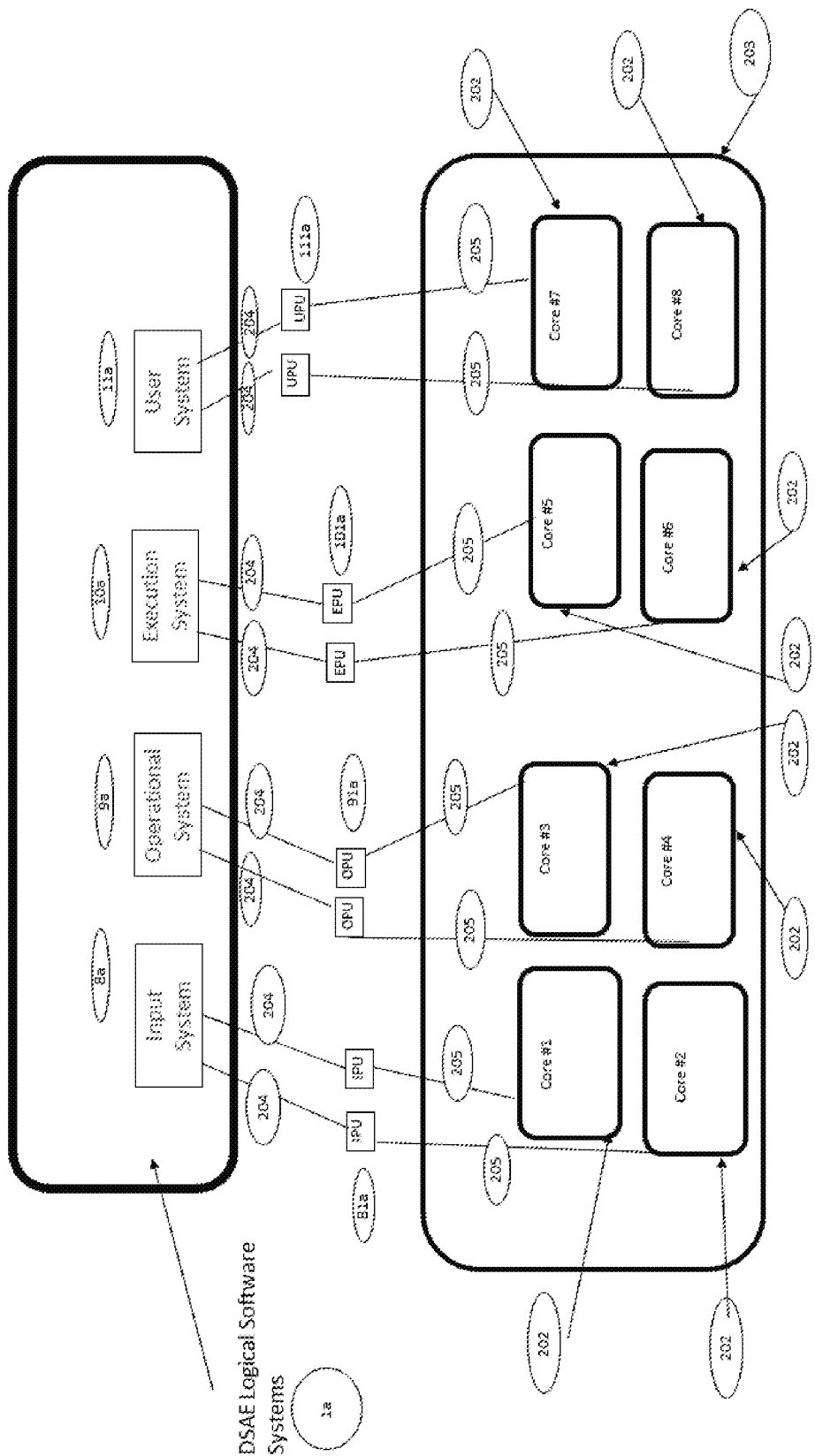
FIG. 1 illustrates an example embodiment of the dynamic security architecture environment (DSAE) implemented with an integrated circuit/processor residing in an endpoint, wherein the endpoint has eight hardware cores, can contain software emulated processor core instruction sets or non-emulated hardware processor core instruction sets, and wherein each core has its own independent power.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Currently, some of the most significant cyber attacks or other malicious attacks against systems are:

Denial of Service attacks
E-mail based (Phishing) attacks
Mobile device attacks
Web based attacks
Supply-chain attacks Attacks against a system usually occur on some type of environment that includes an endpoint where an attack gets executed. To break into a system in a conventional system, the attacker only has to be correct once, yet someone who has to protect a system has to be correct almost all the time. To best attack a system, it greatly helps for an attacker to know information about the system he is attacking. The described Dynamic Security Architecture Environment, in which there is component isolation, is also referred to as a DSAE system, keeps attackers at bay by shifting and changing the attack surface so that an attack is much more difficult to occur on the DSAE system, as it is much more difficult to attack a system when you don't know what you are attacking and when the attack surface is continuously changing.

Aspects described in further detail herein are that the DSAE system is based on a modular architecture in which the monitoring input system is hardware isolated from the execution system running an application, and a control system that interfaces between the input system and the execution system is not only hardware isolated from both the input system and the execution system, but is also not directly connectable to the external network.

Additionally, a modular system helps the system withstand cyber attacks or other malicious attacks by allowing the system to actively mitigate the attacks in real-time, as will be described herein.

One fundamental flaw in today's architectures is that when a system is compromised there are no checks and balances in place. For instance, the program that checks for a specific vulnerability could potentially itself contain a vulnerability which leads to a system with a single point of failure.

The DSAE architecture described further hereinafter puts in place periodic checks and balances, as described herein. This is different than conventional architectures in the industry because it is a combined architecture, hardware, software, and process solution. Current systems have limited protections, which by themselves have been able to be compromised, which has led to a system compromise and thus a loss of availability.

As mentioned previously, the DSAE architecture allows for the attack surface to be continually varied. Contrast this with current electronic devices where an attacker will know the specific attack surface, for example the attacker will know the common Internet browser and applications based on the operating system. So the attacker will know the likely attack surface and hence the attacks which will likely be successful. When running with the DSAE architecture, the adversaries never know exactly what the environment is expected to be or what operating system and applications are running.

The DSAE architecture is also unique in that it has the ability to make intelligent decisions in real time so it reduces the possibility of a single point of failure in the environment, as described herein.

In one particular aspect, the DSAE architecture has the ability to make inquiries about the input units. After receiving answers to those inquiries, the system is able to determine the best environment to run a particular application or input message or file. A DSAE system also obtains forensics about the input so that an attack can be re-created for purposes of evidence.

In addition to determining the safest and most secure execution environment, the DSAE architecture will dynamically assign risk levels so when an input unit requests a specific service the system is able to use historical baselines and customer-determined parameters to make instantaneous decisions on whether and where to run an input unit. Example outcomes are to run in a hardware-isolated environment, to run on multiple hardware-isolated environments or run in an environment which has network access. In addition, more questions can be asked and the environment continually changing, implying a constantly-shifting attack surface. With this changing attack surface an attack that just worked a moment before will likely not succeed a moment later. A DSAE system provides a static risk score and a dynamic risk awareness score. This provides a constant evaluation of the riskiness of certain activities on a DSAE system, and thus can help drive accountability.

Some attacks may not run immediately but rather might be delayed for a certain period of time. When a delayed attack is initially injected into the system it interrogates the hardware and software components at that point in time and determines the attack will be successful. Due to the changing state of the system, when the attack is launched the hardware and software components are likely to be different and therefore the attack will most likely fail.

The DSAE architecture will also track authentication credentials for users and those credentials will be offloaded from the operating system running the authentication. With this offloading, there is limited ability to compromise the credentials eliminating certain types of attacks against the system. Privilege escalations attacks are harder to implement against a DSAE system due to a separation of heightened privileges. Additionally, a DSAE system can create and store dynamically generated passwords so that passwords on a DSAE system always change dynamically without the need for the user to know of all the passwords.

As background, it is important to note that with multiple isolated processors as described herein, substantially real-time determinations can take place regarding whether the system has been compromised, such that within seconds of an attack beginning, counter steps can be taken to address it. As such, the DSAE architecture has, in embodiments described, this characteristic. On systems without multiple isolated hardware processors, a system has no way to determine in real time whether it has been compromised. Once code loads and executes on a non-isolated chip there is no way for that processor to determine if it is running compromised or malicious code. A DSAE system has the checks and balances so that no, one, single compromise of an isolated processor can bring down the entire system. Other processors will watch the running chip to make sure any compromise is contained, which is particularly useful within Internet of Things (IoT) devices and environments.

With the DSAE architecture in place in a system, there is also the ability to provide a DSAE Assurance Score: This term means providing scores dynamically so the end user or administrator knows the riskiness of their current behavior. The score is calculated both dynamically and statically. The score is computed statically by the organization, data owner or organizational policies for certain tasks. Each task receives a static risk assurance score, which determines allowed DSAE configurations that get created by the use of different DSAE Ingredients. DSAE Ingredients have both static initial DSAE Assurance Scores that get generated based on the scores of known components. After a base DSAE Configuration is created using DSAE Ingredients the score is further calculated based on dynamic variables to the environment, user accounts, tasks, functional workflows, etc. If a DSAE Assurance Score cannot be achieved, a workflow or task will not run without a third-party intervention. DSAE Monitoring. One principle of a DSAE machine is that other hardware components in the system monitor whether a process compromises a system (and thus the availability of the system). The DSAE Architecture is more than just High-Availability (HA) because it uses stored historical information and dynamic runtime information that is accessed by a different hardware component to determine if a processor was compromised and thus unavailable.

One principle of a DSAE machine is that other hardware components in the system monitor whether a process compromises a system (and thus the availability of the system). The DSAE Architecture is more than just High-Availability (HA) because it uses stored historical information that is accessed by a different hardware component to determine if a processor was compromised and thus unavailable.

The DSAE system can use a DSAE Protocol that the components and modules within a DSAE system use to communicate. The protocol is a dynamic protocol, as described herein, that can change based on the environment, workloads, data sets and variances in system performance. The protocol adapts transparently based on dynamic needs, and preferably does this by adding a header to normal internal message, which internal messaging also passes received external data. The added head may contain, for example, additional fields such as message type, priority, ratings, or priority classification. A message type will be, for example "stop sending these messages type" or a "continue sending these messages type"; ratings will be like those of a movie, and priority having a time-sensitivity based aspect thereto; whereas confidentiality classification having a sensitivity aspect, such as secret, top secret, etc.

Additionally, the protocol is both an internal DSAE protocol, yet it will also be an open Internet protocol at some point in the future. For now, the protocol has both an Internal and External implementations. Additionally, the protocol is very structured in the messaging format and the state of the protocol is kept track of continually.

Relevant to the DSAE security architecture overall, is the ability of the DSAE architecture to combat supply-chain attacks. Supply-chain attacks can occur in hardware or software, with both being extremely dangerous. One of the big concerns with supply chain attacks is that a compromise of one software component or hardware unit can cause a compromise of the entire product being created. The DSAE architecture combats these attacks in a few ways. First, the independent, isolated hardware units and software logical systems working together as a system, yet also independently for specific tasks, creates a check and balance mechanism in the DSAE security architecture for use by electronic devices that yield a product. Furthermore, because the DSAE security architecture contains independent and different hardware units (which preferably each contain different processor core clocking mechanisms and circuitry) and software components, a compromise of all the hardware units and software components in the complete electronic system is exponentially more difficult for adversaries as they may not have control or knowledge of all the hardware units or software components that make up a specific product leveraging the DSAE security architecture. Essentially, this means that the overall concept of the DSAE security architecture is able to achieve a changing attack surface at the supply-chain level for an electronic product, thus helping to combat electronic device supply-chain attacks.

Example Embodiments of the DSAE Architecture in a Processor on an Integrated Circuit/System on a Chip/Processor Although not necessarily optimal, the DSAE security architecture can be implemented on a one hardware core one hardware processor system, or potentially on a two hardware cores, one-processor system, or on a configuration that is less than a four hardware core system, which is a non-optimal configuration of the DSAE security architecture. In addition, when the DSAE security architecture is implemented on a one or two hardware processor core embodiment, it is highly likely that the DSAE architecture is implemented through software isolation instead of hardware isolation, which is a possible, yet non-optimal configuration of the DSAE architecture.

As disclosed herein, a preferred embodiment of the DSAE architecture in an integrated circuit/processor is with a system having eight hardware processor cores in one physical Processor Packing Unit (PPU), using different instruction sets. Eight hardware processor cores in one PPU is a preferred embodiment of this architecture, even though a DSAE security architecture implemented in a processor can use different processor instruction sets through software emulation and virtualization on one, two, three, four, five, six or seven cores inside one PPU, albeit these core configurations are in a non-optimal DSAE security architecture processor configuration.

Individual processor cores, either through physical hardware cores implementing different processor instruction sets, or through software emulation of different processor instruction sets, comprise the different processing units of the DSAE security architecture as disclosed herein. These different processing units of the DSAE security architecture can include: a User Processing Unit (UPU), an Operational Processing Unit (OPU), an Input Processing Unit (IPU), and an Execution Processing Unit (EPU). These processing units, as described in more detail below, interact with different logic or software modules to effect the security protection provided by the DSAE security architecture. These logic or software modules of the DSAE security architecture, as described in more detail below, can include: an Input System, a User System, an Operational System, and an Execution System.

As disclosed for various example embodiments herein, the DSAE processor is not a security processor or security co-processor. Rather, the DSAE security architecture for processors is a solution to make circuits/processors fundamentally secure. As a result, the DSAE security architecture for processors can make data processors and processing systems immune to many different types of cyber attacks or other malicious attacks through a heterogeneous implementation of different types of processor instruction sets executing inside a single processor package. The DSAE security architecture for processors as disclosed herein can be implemented with processors wherein input/output (I/O) operations execute in the core itself (e.g., ARM™) or a south bridge (e.g., Intel™). The DSAE security architecture for processors as disclosed herein can also be implemented with processor systems with independent or shared caches and/or independent or shared main memory. Core caches can be shared or dedicated in this architecture. Dedicated caches for each core are highly preferred, yet the DSAE security architecture for processors as disclosed herein supports both shared and non-shared caches. Access methods to memory are also dictated by each individual core depending on the core processor architecture type (e.g., Intel™ x86, i386, x86_64, MIPS, MIPS32, MIPS64, ARM, ARM7, ARM8, ARM9, PPC, etc.). Processor cores in each processor can, preferably, be clocked using dedicated clocking mechanisms and circuitry, or shared clocking mechanisms and circuitry, yet dedicated clocking mechanisms and circuitry are highly preferred. In addition, preferred embodiments of individual processor core circuitry is exclusive and isolated for each core, yet shared embodiments of core circuitry are also possible, yet not preferred. The details of the various example embodiments disclosed herein are provided below and in the accompanying drawings.

Referring now to FIG. 1, an example embodiment of the dynamic security architecture environment (DSAE) is shown as implemented with an integrated circuit/processor residing in an endpoint, wherein the endpoint has eight hardware cores, can contain software emulated processor core instruction sets or non-emulated hardware processor core instruction sets, and wherein each core has its own independent power source. This is a preferred implementation of the DSAE security architecture implemented in a circuit packaging (203), in accordance with the security and redundancy principles of the DSAE security architecture.

As shown in FIG. 1, eight hardware processor cores provide the ability for individual, isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, eight or more cores also allow for the individual processor cores (Core 1, Core 2, Core 3, Core 4, Core 5, Core 6, Core 7, and Core 8) to have its own dedicated power (202) supplied to each individual core. After eight cores, multiples of four cores being added (12, 16, 20, 24, 28, 32, 36, 40, 44, 48, 52, 56, etc.) would also yield very useful DSAE configurations, if each core is assigned to a different DSAE processing unit (IPU, OPU, EPU, UPU) and logic DSAE system (Input System, Operational System, Execution System and User System).

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the preferred embodiment shown in FIG. 1, each hardware core has its own, independent power source (202). Power sourcing can be important so that the DSAE security architecture integrated circuit implementation can maximize availability.

In FIG. 1, lines 205 represent paths from a physical core to a DSAE processor unit (81a, 91a, 101a, or 111a) (and the software emulated core instruction sets if the core is running an emulated processor instruction set), which map into a DSAE logic system (8a, 9a, 10a, or 11a). In FIG. 1, lines 204 map a DSAE processing unit (81a, 91a, 101a, or 111a) to a corresponding DSAE logic system (8a, 9a, 10a, or 11a).

Figure 2:
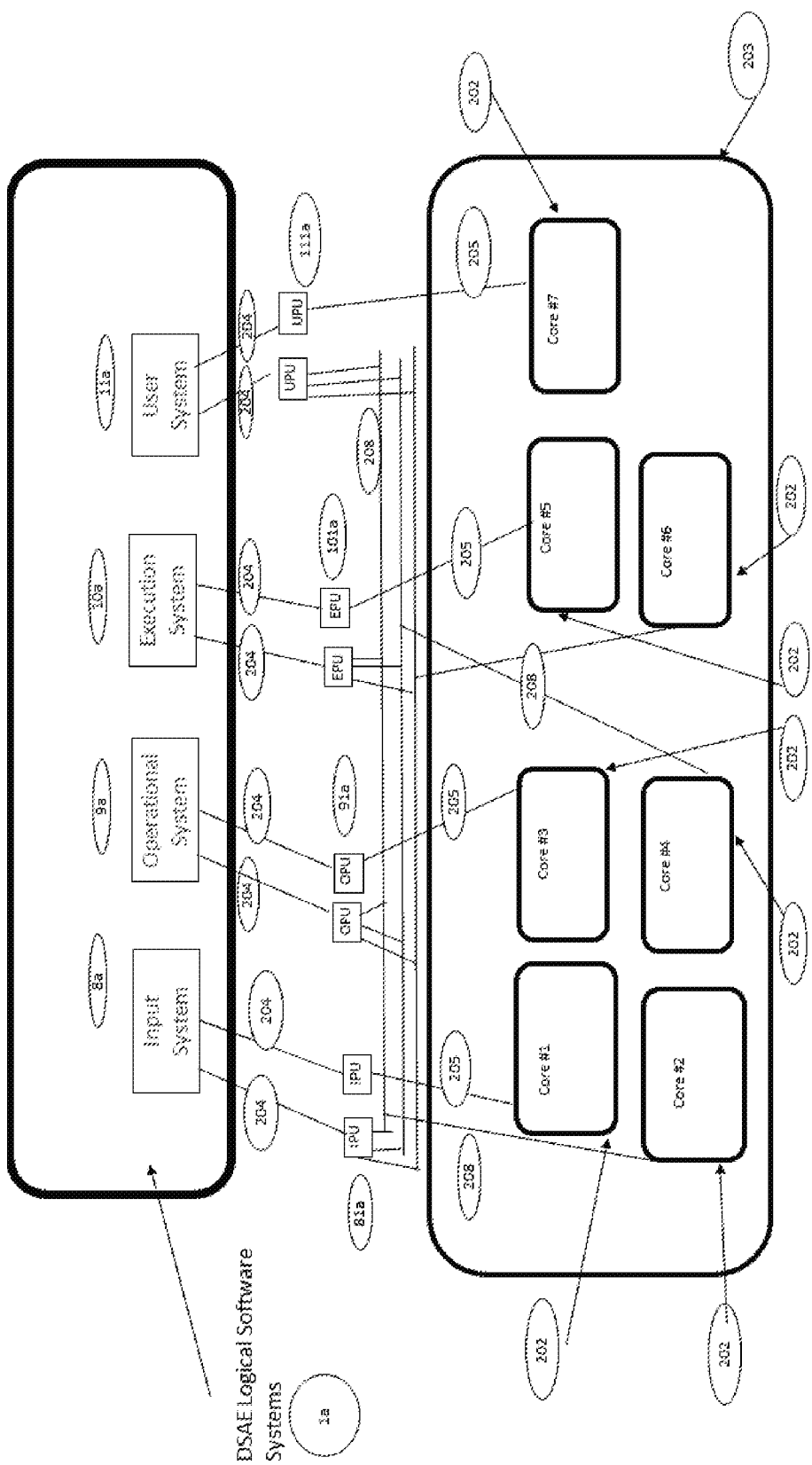
FIG. 2 illustrates an example embodiment of the DSAE implemented with an integrated circuit/processor residing in an endpoint, wherein the endpoint has seven hardware cores, can contain software emulated processor core instruction sets or non-emulated hardware processor core instruction sets, wherein each core has its own independent power, one or more cores monitor the security system, and a virtual processing unit is included.

Referring now to FIG. 2, an example embodiment of the DSAE is shown as implemented with an integrated circuit/processor residing in an endpoint, wherein the endpoint has seven hardware cores, can contain software emulated processor core instruction sets or non-emulated hardware processor core instruction sets, wherein each hardware core has its own independent power, one or more cores monitor the security system, and a virtual processing unit is included. This is a plausible implementation of the DSAE security architecture as implemented in a circuit packaging (203). It is not as efficient as an eight hardware core implementation of the DSAE security architecture on a circuit as described above; yet, it is still a very useful implementation of the DSAE security architecture in a circuit.

As shown in FIG. 2, seven hardware processor cores provide the ability for individual, isolated hardware cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, seven or more cores also allow for the individual hardware processor cores (Core 1, Core 2, Core 3, Core 4, Core 5, Core 6, and Core 7) to have its own dedicated power (202) supplied to each individual core. After seven cores, multiples of four cores being added (11, 15, 19, 23, 27, 31, 35, 39, 43, 47, 51, 55, etc.) would also yield very useful DSAE configurations by assigning Core 1, Core 2, Core 3, and Core 4 into a different DSAE processing unit (IPU, OPU, EPU, UPU) and logic DSAE system (Input System, Operational System, Execution System, and User System). Then, the remaining hardware cores (Core 5, Core 6, and Core 7) monitor each DSAE logic system (8a, 9a, 10a, and 11a) via software running on the core and using a hardware path 208 into each required DSAE processing unit (208 represents the hardware path, the heartbeat monitoring software and a software emulated processor core instruction sets or a non-emulated hardware processor core instruction set). As a result, the remaining cores can become a full, dedicated IPU, OPU, EPU, or UPU for the corresponding DSAE logic system as needed/determined by the monitoring software running on the remaining cores.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 2, each hardware core has its own, independent power source (202). Power sourcing can be important so that the DSAE security architecture integrated circuit implementation can maximize availability.

In FIG. 2, lines 205 represent paths from a physical core to a DSAE processor unit (81a, 91a, 101a, or 111a) (and the software emulated core instruction set if the core is running an emulated processor instruction set), which map into a DSAE logic system (8a, 9a, 10a, or 11a). In FIG. 2, lines 204 map a DSAE processing unit (81a, 91a, 101a, or 111a) to a corresponding DSAE logic system (8a, 9a, 10a, or 11a).

Figure 3:
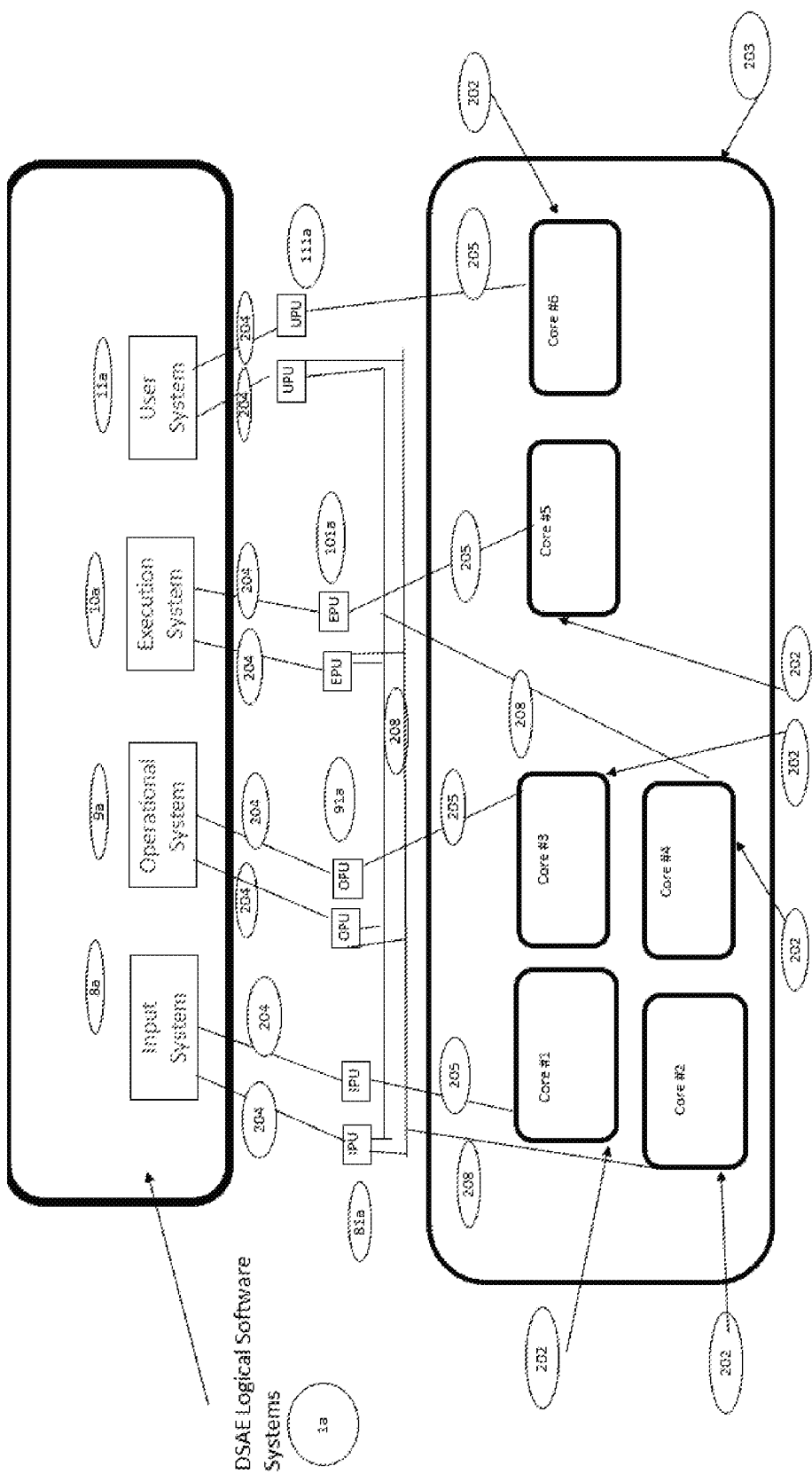
FIG. 3 illustrates an example embodiment of the DSAE implemented with an integrated circuit/processor residing in an endpoint, wherein the endpoint has six hardware cores, can contain software emulated processor core instruction sets or non-emulated hardware processor core instruction sets, wherein each core has its own independent power, one or more cores monitor the security system, and a virtual processing unit is included.

Referring now to FIG. 3, an example embodiment of the DSAE is shown as implemented with an integrated circuit/processor residing in an endpoint, wherein the endpoint has six hardware cores, can contain software emulated processor core instruction sets or non-emulated hardware processor core instruction sets, wherein each hardware core has its own independent power, one or more cores monitor the security system, and a virtual processing unit is included. This is a plausible implementation of the DSAE security architecture implemented in a circuit packaging (203). It is not as efficient as an eight hardware core implementation of the DSAE security architecture on a circuit as described above; yet, it is still a very useful implementation of the DSAE security architecture in a circuit.

As shown in FIG. 3, six hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, six or more hardware cores also allow for the individual hardware processor cores (Core 1, Core 2, Core 3, Core 4, Core 5, and Core 6) to have its own dedicated power (202) supplied to each individual core. After six hardware cores, multiples of four cores being added (10, 14, 18, 22, 26, 30, 34, 38, 42, 46, 50, 54, etc.) would also yield very useful DSAE configurations by assigning Core 1, Core 3, Core 5 and Core 6 into a different DSAE processing unit (IPU, OPU, EPU, UPU) and logic DSAE system (Input System, Operational System, Execution System and User System). Then, the remaining cores (Core 2 and Core 4) monitor each DSAE logic system (8a, 9a, 10a, and 11a) via software running on the core and using a hardware path 208 into each required DSAE processing unit (208 represents the hardware path, the heartbeat monitoring software and a software emulated processor core instruction set or a non-emulated hardware processor core instruction set). As a result, the remaining cores can become a full, dedicated IPU, OPU, EPU or UPU for the corresponding DSAE logic system as needed/determined by the monitoring software running on the remaining cores.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 3, each hardware core has its own, independent power source (202). Power sourcing can be important so that the DSAE security architecture integrated circuit implementation can maximize availability.

In FIG. 3, lines 205 represent paths from a physical core to a DSAE processor unit (81a, 91a, 101a, or 111a) (and the software emulated core instruction set if the core is running an emulated processor instruction set), which map into a DSAE logic system (8a, 9a, 10a, or 11a). In FIG. 3, lines 204 map a DSAE processing unit (81a, 91a, 101a, or 111a) to a corresponding DSAE logic system (8a, 9a, 10a, or 11a).

Figure 4:
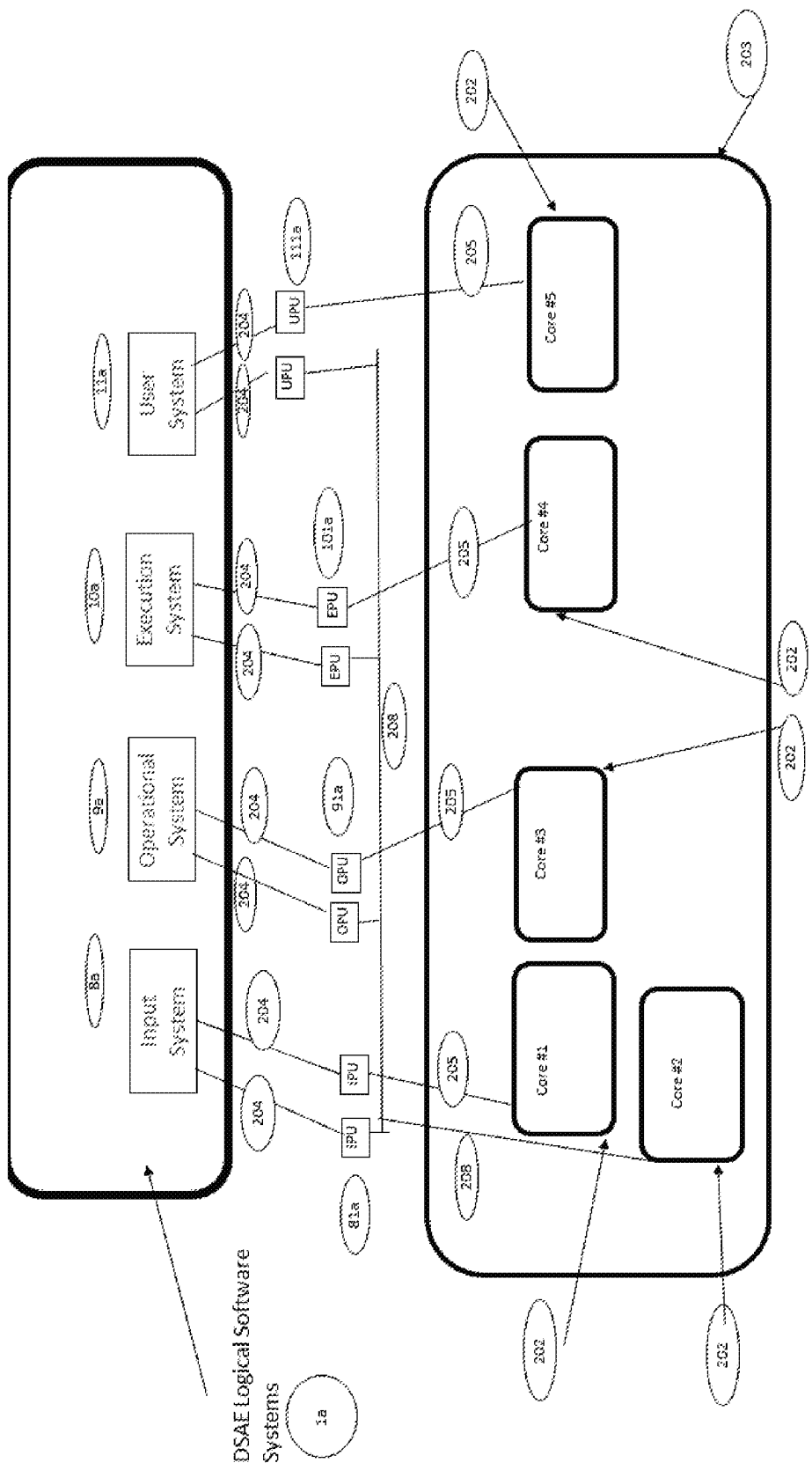
FIG. 4 illustrates an example embodiment of the DSAE implemented with an integrated circuit/processor residing in an endpoint, wherein the endpoint has five hardware cores, can contain software emulated processor core instruction sets or non-emulated hardware processor core instruction sets, wherein each core has its own independent power, one or more cores monitor the security system, and a virtual processing unit is included.

Referring now to FIG. 4, an example embodiment of the DSAE is shown as implemented with an integrated circuit/processor residing in an endpoint, wherein the endpoint has five hardware cores, can contain software emulated processor core instruction sets or non-emulated hardware processor core instruction sets, wherein each hardware core has its own independent power, one or more cores monitor the security system, and a virtual processing unit is included. This is a plausible implementation of the DSAE security architecture implemented in a circuit packaging (203). It is not as efficient as an eight hardware core implementation of the DSAE security architecture on a circuit as described above; yet, it is still a very useful implementation of the DSAE security architecture in a circuit.

As shown in FIG. 4, five hardware processor cores provide the ability for individual, hardware isolated cores to support the individual processing units that comprise the various processing units of the DSAE security architecture, including: Input Processing Unit (81*a*), Operational Processing Unit (91*a*), Execution Processing Unit (101*a*), and User Processing Unit (111*a*). The DSAE processing units support the DSAE logic systems (1*a*), including: Input System (8*a*), Operational System (9*a*), Execution System (10*a*), and User System (11*a*). In addition, five or more cores also allow for the individual hardware processor cores (Core 1, Core 2, Core 3, Core 4, and Core 5) to have its own dedicated power (202) supplied to each individual core. After five cores, multiples of four cores being added (9, 13, 17, 21, 25, 29, 33, 37, 41, 45, 49, 53, etc.) would also yield very useful DSAE configurations by assigning Core 1, Core 5, Core 3 and Core 4 into a different DSAE processing unit (IPU, OPU, EPU, UPU) and logic DSAE system (Input System, Operational System, Execution System and User System). Then, the remaining core (Core 2) can monitor each DSAE logic system (8*a*, 9*a*, 10*a*, and 11*a*) via software running on the core and using a hardware path 208 into each required DSAE processing unit (208 represents the hardware path, the heartbeat monitoring software and a software emulated processor core instruction set or a non-emulated hardware processor core instruction set). As a result, the remaining core can become a full, dedicated IPU, OPU, EPU or UPU for the corresponding DSAE logic system as needed/determined by the monitoring software running on the remaining core.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 4, each hardware core has its own, independent power source (202). Power sourcing can be important so that the DSAE security architecture integrated circuit implementation can maximize availability.

In FIG. 4, lines 205 represent paths from a physical core to a DSAE processor unit (81*a*, 91*a*, 101*a*, or 111*a*) (and the software emulated core instruction set if the core is running an emulated processor instruction set), which map into a DSAE logic system (8*a*, 9*a*, 10*a*, or 11*a*). In FIG. 4, lines 204 map a DSAE processing unit (81*a*, 91*a*, 101*a*, or 111*a*) to a corresponding DSAE logic system (8*a*, 9*a*, 10*a*, or 11*a*).

Figure 5:
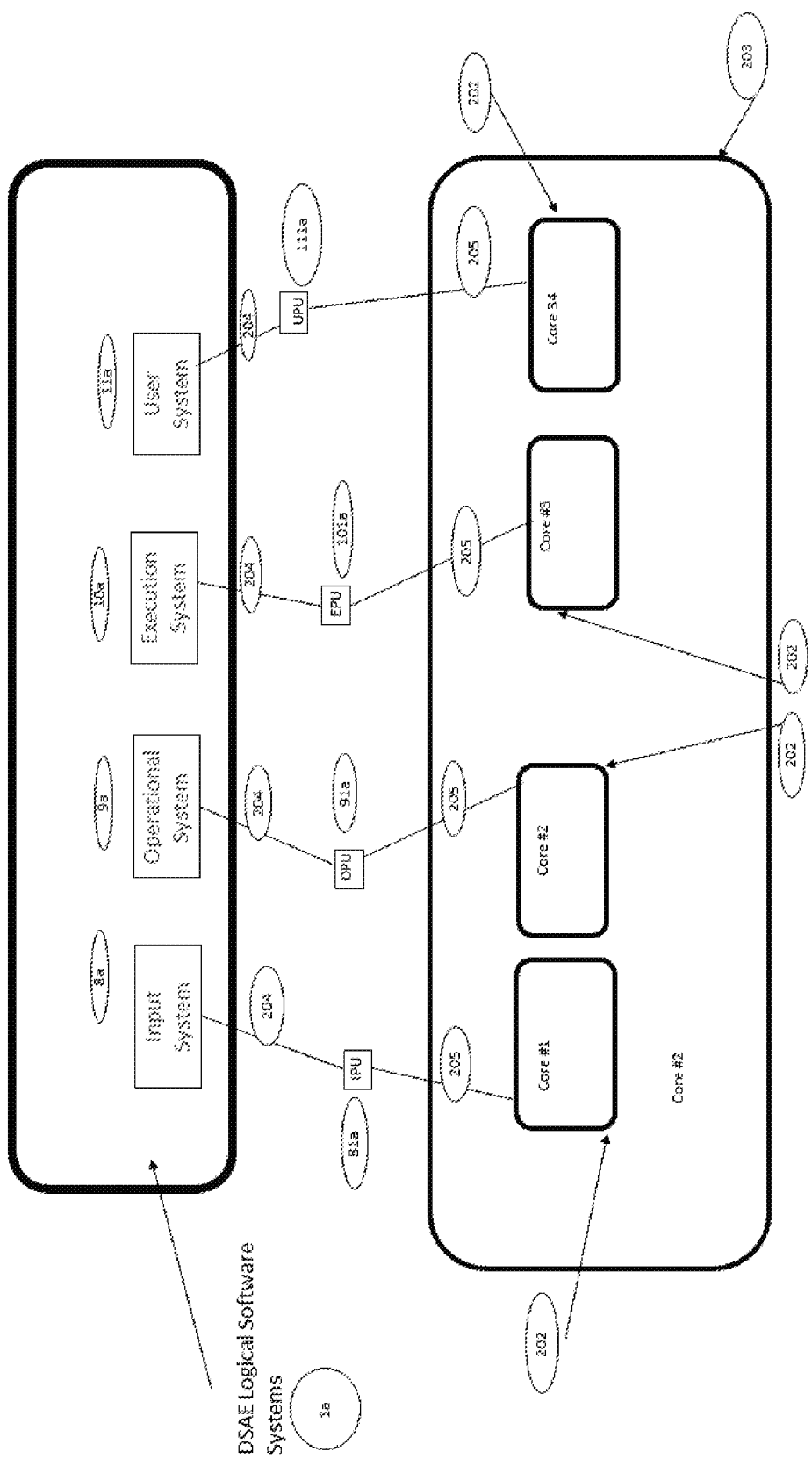
FIG. 5 illustrates an example embodiment of the DSAE implemented with an integrated circuit/processor residing in an endpoint, wherein the endpoint has four hardware cores, can contain software emulated processor core instruction sets or non-emulated hardware processor core instruction sets, and wherein each core has its own independent power.

Referring now to FIG. 5, an example embodiment of the DSAE is shown as implemented with an integrated circuit/processor residing in an endpoint, wherein the endpoint has four cores, can contain software emulated processor core instruction sets or non-emulated hardware processor core instruction sets, and wherein each hardware core has its own independent power. This is a plausible implementation of the DSAE security architecture implemented in a circuit packaging (203) and is the minimum number of hardware cores, four, recommended for implementation of the DSAE security architecture in a circuit.

As shown in FIG. 5, four hardware processor cores provide the ability for individual, hardware isolated cores to support the individual processing units that comprise the various processing units of the DSAE security architecture, including: Input Processing Unit (81*a*), Operational Processing Unit (91*a*), Execution Processing Unit (101*a*), and User Processing Unit (111*a*). The DSAE processing units support the DSAE logic systems (1*a*), including: Input System (8*a*), Operational System (9*a*), Execution System (10*a*), and User System (11*a*). In addition, four or more cores also allow for the individual processor cores (Core 1, Core 2, Core 3, and Core 4) to have its own dedicated power (202) supplied to each individual core. After four cores, multiples of four cores being added (8, 12, 16, etc.) would also yield very useful DSAE configurations by assigning Core 1, Core 2, Core 3, and Core 4 into a different DSAE processing unit (IPU, OPU, EPU, UPU) and logic DSAE system (Input System, Operational System, Execution System, and User System) and then the cores (Core 1, Core 2, Core 3, and Core 4) can monitor each DSAE logic system (8*a*, 9*a*, 10*a*, and 11*a*) via software running on the core and using a hardware path into each required DSAE processing unit. As a result, the remaining cores can become a full, dedicated IPU, OPU, EPU or UPU for the corresponding DSAE logic system as needed/determined by the monitoring software running on the remaining core in parallel to its own processing unit (IPU, OPU, EPU or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 5, each hardware core has its own, independent power source (202). Power sourcing can be important so that the DSAE security architecture integrated circuit implementation can maximize availability.

In FIG. 5, lines 205 represent paths from a physical core to a DSAE processor unit (81*a*, 91*a*, 101*a*, or 111*a*) (and a software emulated processor core instruction set or a non-emulated hardware processor core instruction set), which map into a DSAE logic system (8*a*, 9*a*, 10*a*, or 11*a*). In FIG. 5, lines 204 map a DSAE processing unit (81*a*, 91*a*, 101*a*, or 111*a*) to a corresponding DSAE logic system (8*a*, 9*a*, 10*a*, or 11*a*).

Figure 6:
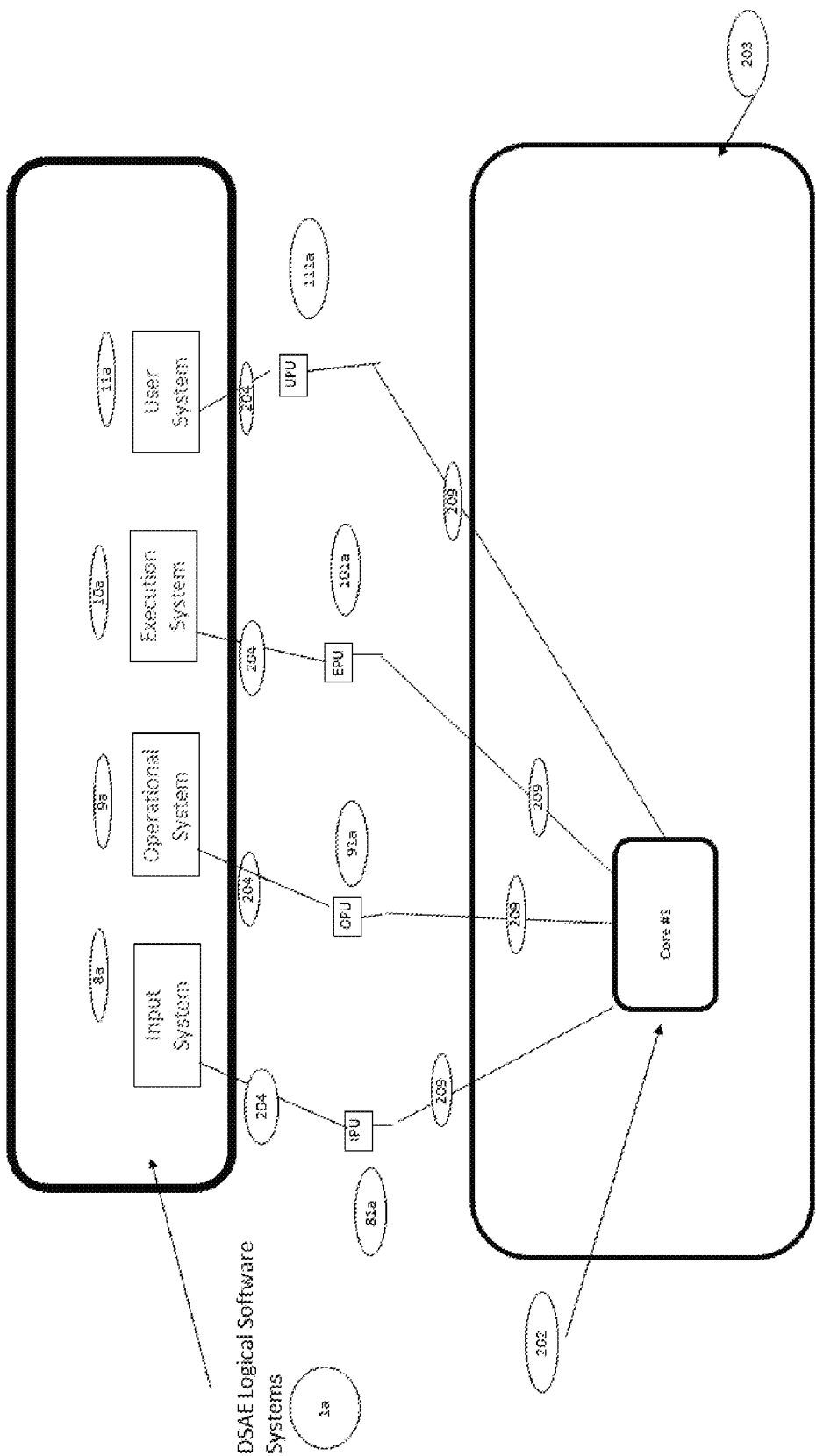
FIG. 6 illustrates an example embodiment of the DSAE implemented with an integrated circuit/processor residing in an endpoint, and wherein the endpoint has one hardware core with software emulation to emulate different processor instruction sets, one or more cores monitor the security system, and a virtual processing unit is included.

Referring now to FIG. 6, an example embodiment of the DSAE is shown as implemented with an integrated circuit/processor residing in an endpoint, and wherein the endpoint has one hardware core with software emulation. This is a possible, yet not preferred implementation of the DSAE security architecture implemented in a circuit packaging (203). One hardware processor core provides the ability to support the individual processing units that comprise the various processing units of the DSAE security architecture, including: Input Processing Unit (81*a*), Operational Processing Unit (91*a*), Execution Processing Unit (101*a*), and User Processing Unit (111*a*). The DSAE processing units support the DSAE logic systems (1*a*), including: Input System (8*a*), Operational System (9*a*), Execution System (10*a*), and User System (11*a*) through software emulation only without redundancy. This implementation also removes many of the isolation characteristics of the DSAE security architecture and thus is another reason why this implementation is not preferred.

One hardware core, through software emulation, creates multiple emulated cores of different processor architecture types in addition to running software to monitor each DSAE logic system (8*a*, 9*a*, 10*a*, and 11*a*) via software running on the core and using a hardware path 209 into each required DSAE processing unit (209 represents the hardware path, the monitoring software and also the emulated processor cores or hardware non-emulated cores). As a result, the emulated processor cores can become an IPU, OPU, EPU, or UPU for the corresponding DSAE logic system as needed/determined by the monitoring software running on the remaining emulated cores in parallel. This is not a preferred implementation or configuration of the DSAE security architecture on a circuit.

Inside the circuit packaging (203), the emulated processor cores contain different processor instruction sets for the cores, such as: i386, x86_64, MIPS, MIPS32, MIPS64, ARM, ARM7, P ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In FIG. 6, lines 209 represent paths from a physical core or emulated core to a DSAE processor unit (81*a*, 91*a*, 101*a*, or 111*a*), which map into a DSAE logic system (8*a*, 9*a*, 10*a*, or 11*a*). In FIG. 6, lines 204 map a DSAE processing unit (81*a*, 91*a*, 101*a*, or 111*a*) to a corresponding DSAE logic system (8*a*, 9*a*, 10*a*, or 11*a*).

Figure 7:
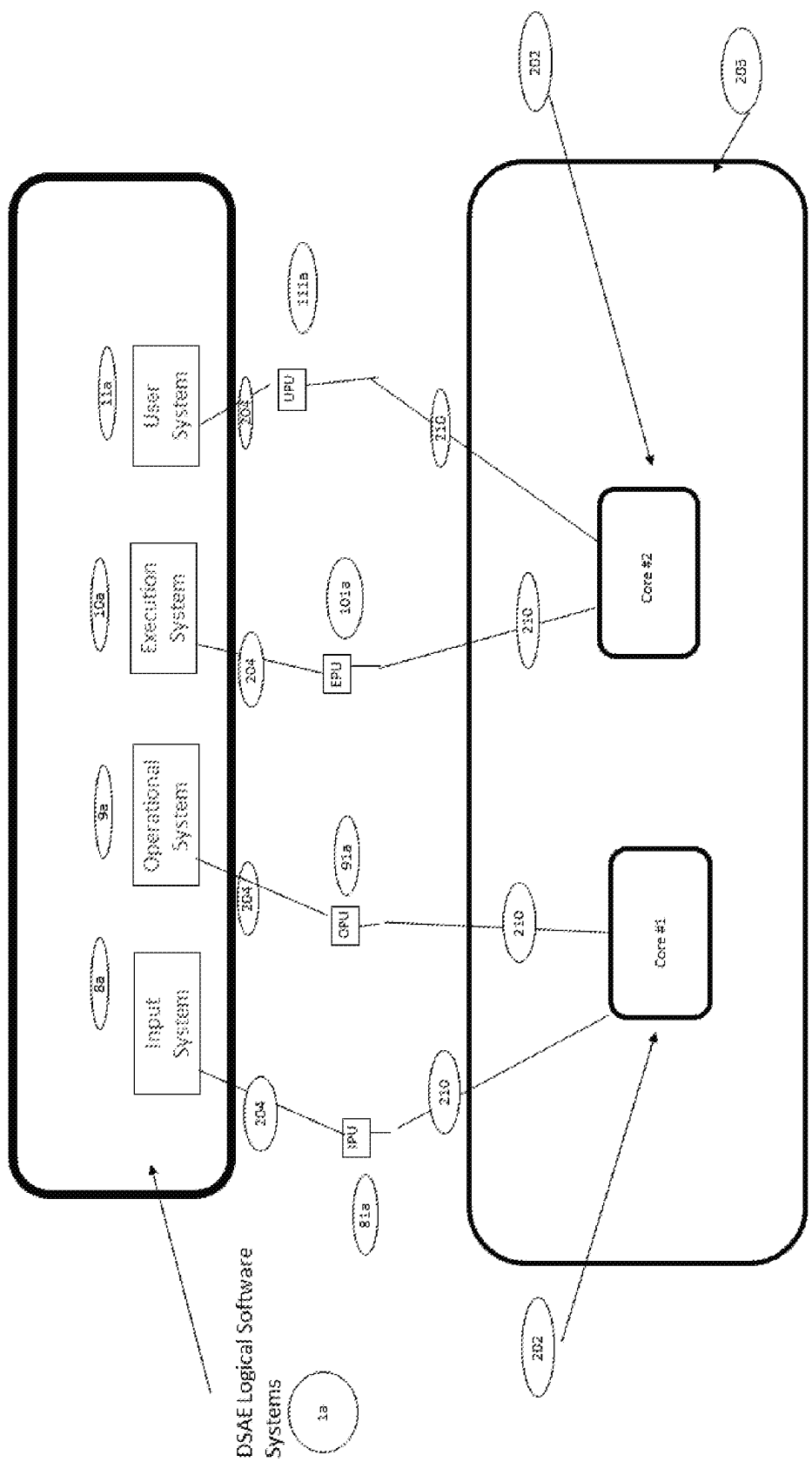
FIG. 7 illustrates an example embodiment of the DSAE implemented with an integrated circuit/processor residing in an endpoint, wherein the endpoint has two hardware cores with software emulation to emulate different processor instruction sets, and wherein each core has its own independent power, one or more cores monitor the security system, and a virtual processing unit is included.

Referring now to FIG. 7, an example embodiment of the DSAE is shown as implemented with an integrated circuit/processor residing in an endpoint, wherein the endpoint has two hardware cores with software emulation, and wherein each hardware core has its own independent power. This is a possible, yet not preferred implementation of the DSAE security architecture implemented in a circuit packaging (203).

As shown in FIG. 7, two hardware processor cores provide the ability for some, individual, hardware isolated cores to support the individual processing units that comprise the various processing units of the DSAE security architecture, including: Input Processing Unit (81*a*), Operational Processing Unit (91*a*), Execution Processing Unit (101*a*), and User Processing Unit (111*a*). The DSAE processing units support the DSAE logic systems (1*a*), including: Input System (8*a*), Operational System (9*a*), Execution System (10*a*), and User System (11*a*). In addition, two or more hardware cores also allow for the individual processor cores (Core 1 and Core 2) to have their own dedicated power (202) supplied to each individual hardware core. Two hardware cores, allow for one non-emulated different core instruction set and one or more emulated core instruction sets to create the different DSAE processing units (IPU, OPU, EPU, UPU) and logic DSAE systems (Input System, Operational System, Execution System, and User System). Then, the cores (Core 1 and Core 2) can monitor each DSAE logic system (8*a*, 9*a*, 10*a* and 11*a*) via software running on the core and using a hardware path 210 into each required DSAE processing unit (210 represents the hardware path, the heartbeat monitoring software, and both a possible non-emulated or emulated core instruction set). As a result, the cores can become IPU, OPU, EPU or UPU for the corresponding DSAE logic system as needed/determined by the monitoring software running on the cores in parallel to its own processing unit (IPU, OPU, EPU or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 7, each physical hardware core has its own, independent power source (202). Power sourcing can be important so that the DSAE security architecture integrated circuit implementation can maximize availability.

In FIG. 7, lines 210 represent paths from a physical core to a DSAE processor unit (81*a*, 91*a*, 101*a*, or 111*a*) (and a software emulated processor core or a non-emulated hardware processor core), which map into a DSAE logic system (8*a*, 9*a*, 10*a*, or 11*a*). In FIG. 7, lines 204 map a DSAE processing unit (81*a*, 91*a*, 101*a*, or 111*a*) to a corresponding DSAE logic system (8*a*, 9*a*, 10*a*, or 11*a*).

Figure 8:
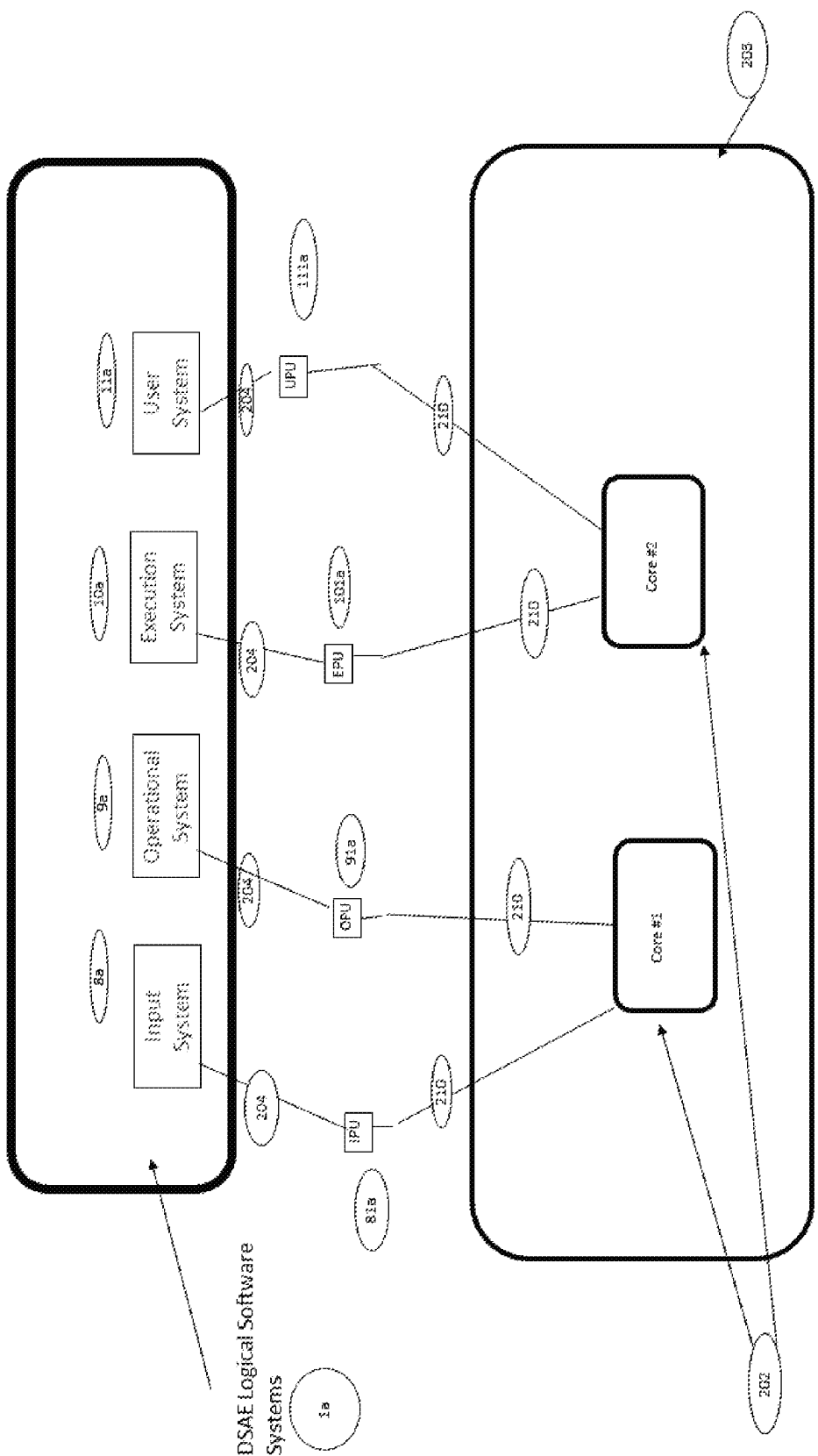
FIG. 8 illustrates an example embodiment of the DSAE implemented with an integrated circuit/processor residing in an endpoint, wherein the endpoint has two hardware cores with software emulation to emulate different processor instruction sets, and wherein the cores share a common power source, one or more cores monitor the security system, and a virtual processing unit is included.

Referring now to FIG. 8, an example embodiment of the DSAE is shown as implemented with an integrated circuit/processor residing in an endpoint, wherein the endpoint has two hardware cores with software emulation, and wherein the hardware cores share a common power source. This is a possible, yet not preferred implementation of the DSAE security architecture implemented in a circuit packaging (203).

As shown in FIG. 8, two hardware processor cores provide some ability for individual, hardware isolated cores to support the individual processing units that comprise the various processing units of the DSAE security architecture, including: Input Processing Unit (81*a*), Operational Processing Unit (91*a*), Execution Processing Unit (101*a*), and User Processing Unit (111*a*). The DSAE processing units support the DSAE logic systems (1*a*), including: Input System (8*a*), Operational System (9*a*), Execution System (10*a*), and User System (11*a*). In addition, in this embodiment the hardware cores (Core 1 and Core 2) share a power source (202), which is not ideal. A two hardware core configuration allows for one non-emulated different core instruction set and one or more emulated core instruction sets to create the different DSAE processing unit (IPU, OPU, EPU, UPU) and logic DSAE system (Input System, Operational System, Execution System and User System). Then, the hardware cores (Core 1 and Core 2) can monitor each DSAE logic system (8*a*, 9*a*, 10*a*, and 11*a*) via software running on the core and using a hardware path 210 into each required DSAE processing unit (210 represents the hardware path, the heartbeat monitoring software, and both a possible non-emulated or emulated core instruction set). As a result, the cores can become IPU, OPU, EPU, or UPU for the corresponding DSAE logic system as needed/determined by the monitoring software running on the cores in parallel to its own processing unit (IPU, OPU, EPU, or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 8, each hardware core does not have its own, independent power source (202). Rather, a common power source is shared for all cores, which is not an optimal embodiment of the DSAE security architecture in a circuit. Power sourcing can be important so that the DSAE security architecture integrated circuit implementation can maximize availability.

In FIG. 8, lines 210 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 8, lines 204 map a DSAE processing unit (81a, 91a, 101a, or 111a) to a corresponding DSAE logic system (8a, 9a, 10a, or 11a).

Figure 9:
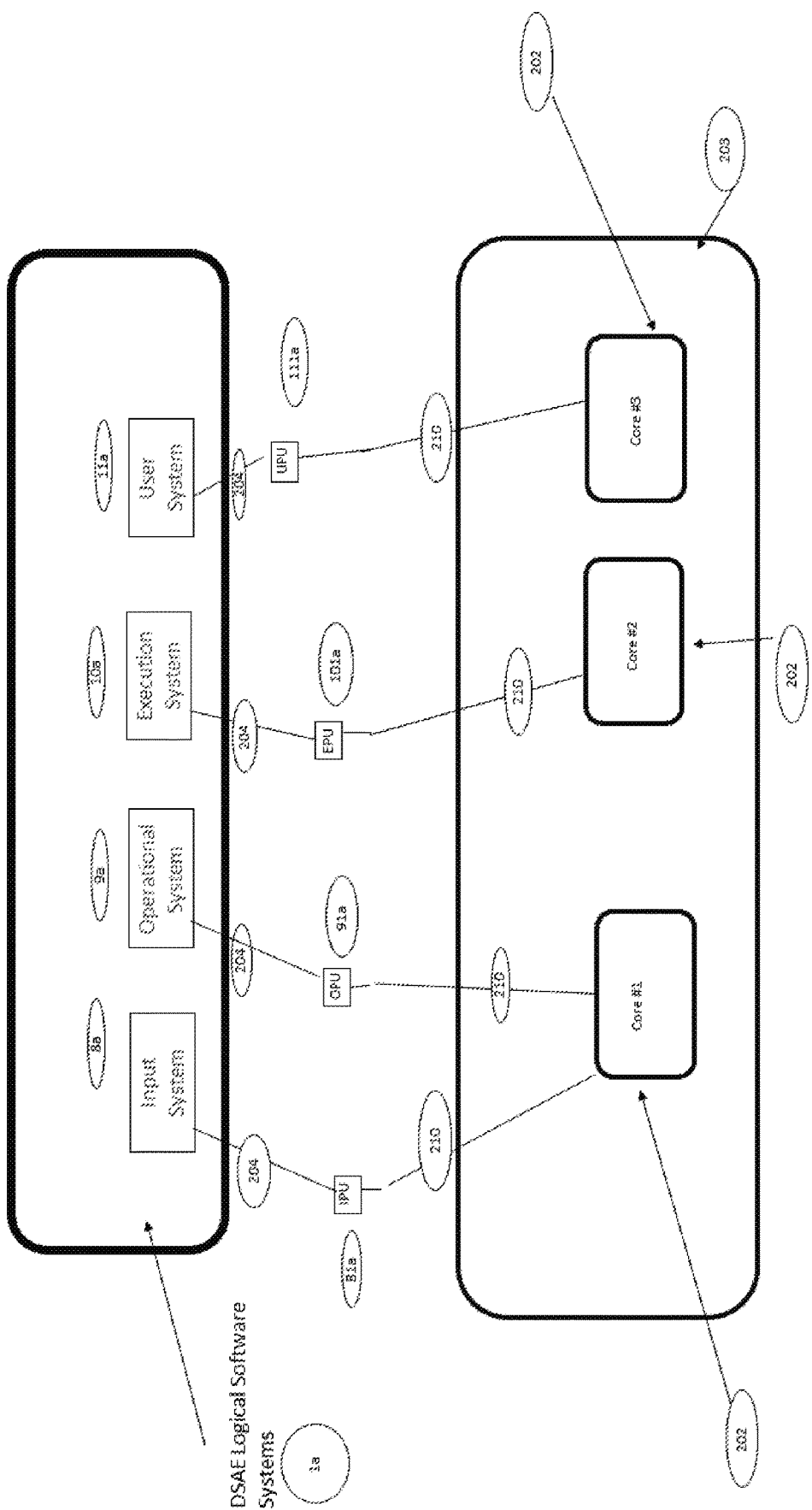
FIG. 9 illustrates an example embodiment of the DSAE implemented with an integrated circuit/processor residing in an endpoint, wherein the endpoint has three hardware cores with software emulation to emulate different processor instruction sets, and wherein each core has its own independent power, one or more cores monitor the security system, and a virtual processing unit is included.

Referring now to FIG. 9, an example embodiment of the DSAE is shown as implemented with an integrated circuit/processor residing in an endpoint, wherein the endpoint has three hardware cores with software instruction set emulation, and wherein each hardware core has its own independent power. This is a possible, yet not preferred implementation of the DSAE security architecture implemented in a circuit packaging (203).

As shown in FIG. 9, three hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, three or more cores also allow for the individual processor cores (Core 1, Core 2, and Core 3) to have their own dedicated power (202) supplied to each individual core. Three cores allow for non-emulated different core instruction sets in hardware and also one or more emulated core instruction sets to create the different DSAE processing unit (IPU, OPU, EPU, UPU) and logic DSAE system (Input System, Operational System, Execution System, and User System). Then, the cores (Core 1, Core 2, and Core 3) can monitor each DSAE logic system (8a, 9a, 10a and 11a) via software running on the core and using a hardware path 210 into each required DSAE processing unit (210 represents the hardware path, the heartbeat monitoring software, and both a possible non-emulated or emulated core instruction set). As a result, the cores can become IPU, OPU, EPU or UPU for the corresponding DSAE logic system as needed/determined by the monitoring software running on the cores in parallel to its own processing unit (IPU, OPU, EPU, or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 9, each hardware core has its own, independent power source (202). Power sourcing can be important so that the DSAE security architecture integrated circuit implementation can maximize availability.

In FIG. 9, lines 210 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 9, lines 204 map a DSAE processing unit (81a, 91a, 101a, or 111a) to a corresponding DSAE logic system (8a, 9a, 10a, or 11a).

Figure 10:
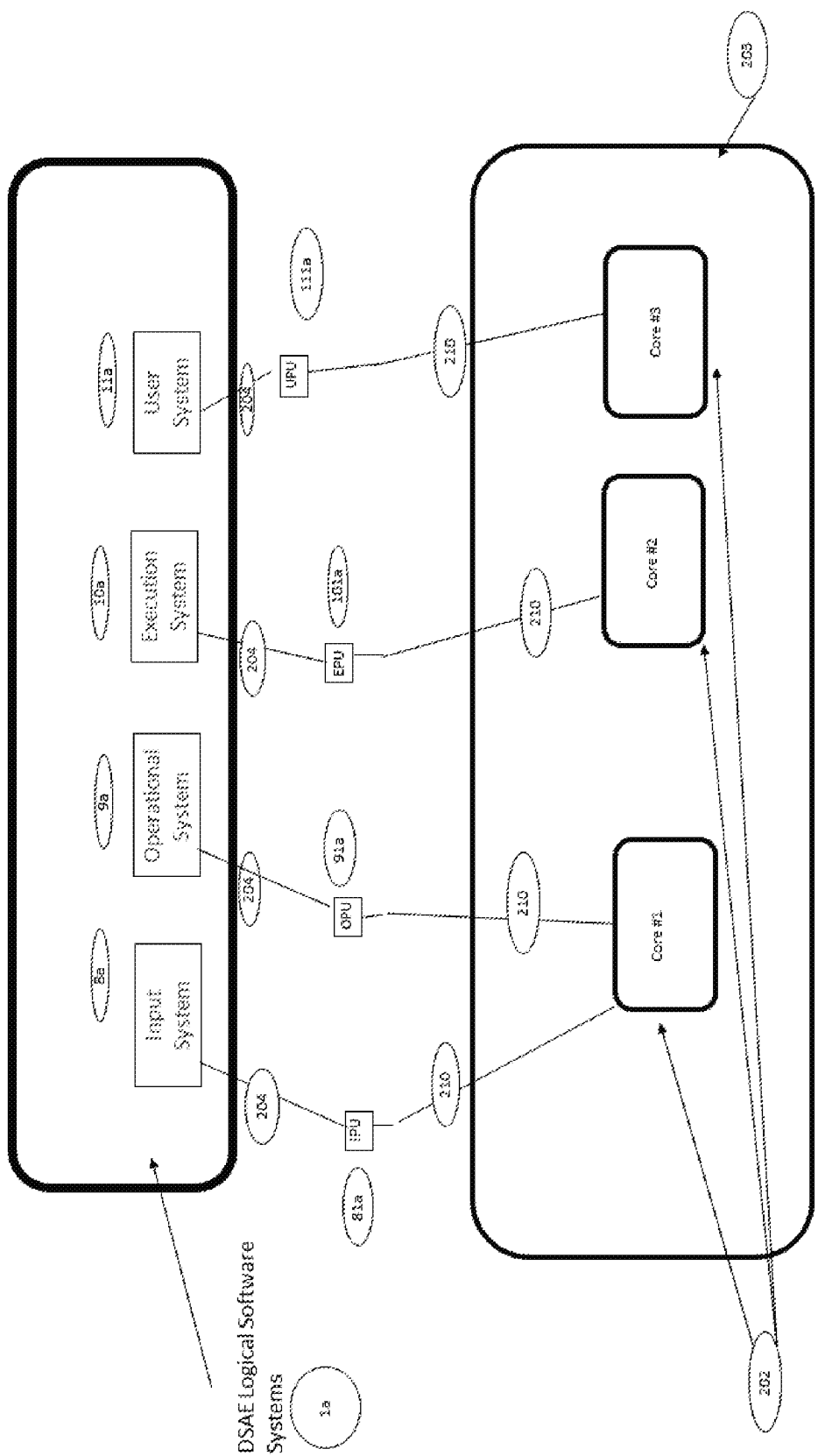
FIG. 10 illustrates an example embodiment of the DSAE implemented with an integrated circuit/processor residing in an endpoint, wherein the endpoint has three hardware cores with software emulation to emulate different processor instruction sets, and wherein the cores share a common power source, one or more cores monitor the security system, and a virtual processing unit is included.

Referring now to FIG. 10, an example embodiment of the DSAE is shown as implemented with an integrated circuit/processor residing in an endpoint, wherein the endpoint has three hardware cores with software instruction set emulation, and wherein the hardware cores share a common power source. This is a possible, yet not preferred implementation of the DSAE security architecture implemented in a circuit packaging (203).

As shown in FIG. 10, three hardware processor cores provide some ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, in this embodiment the hardware cores (Core 1, Core 2, and Core 3) share a power source (202), which is not ideal. Three cores allow for both non-emulated different core instruction sets in hardware and also one or more emulated core instruction sets to create the different DSAE processing unit (IPU, OPU, EPU, UPU) and logic DSAE system (Input System, Operational System, Execution System and User System). Then, the cores (Core 1, Core 2, and Core 3) can monitor each DSAE logic system (8a, 9a, 10a and 11a) via software running on the core and using a hardware path 210 into each required DSAE processing unit (210 represents the hardware path, the heartbeat monitoring software, and both a possible non-emulated or emulated core instruction set). As a result, the cores can become IPU, OPU, EPU or UPU for the corresponding DSAE logic system as needed/determined by the monitoring software running on the cores in parallel to its own processing unit (IPU, OPU, EPU or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU)

associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 10, each hardware core does not have its own, independent power source (202). Rather, a common power source is shared for all cores, which is not an optimal embodiment of the DSAE security architecture in a circuit. Power sourcing can be important so that the DSAE security architecture integrated circuit implementation can maximize availability.

In FIG. 10, lines 210 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 10, lines 204 map a DSAE processing unit (81a, 91a, 101a, or 111a) to a corresponding DSAE logic system (8a, 9a, 10a, or 11a).

Figure 11:
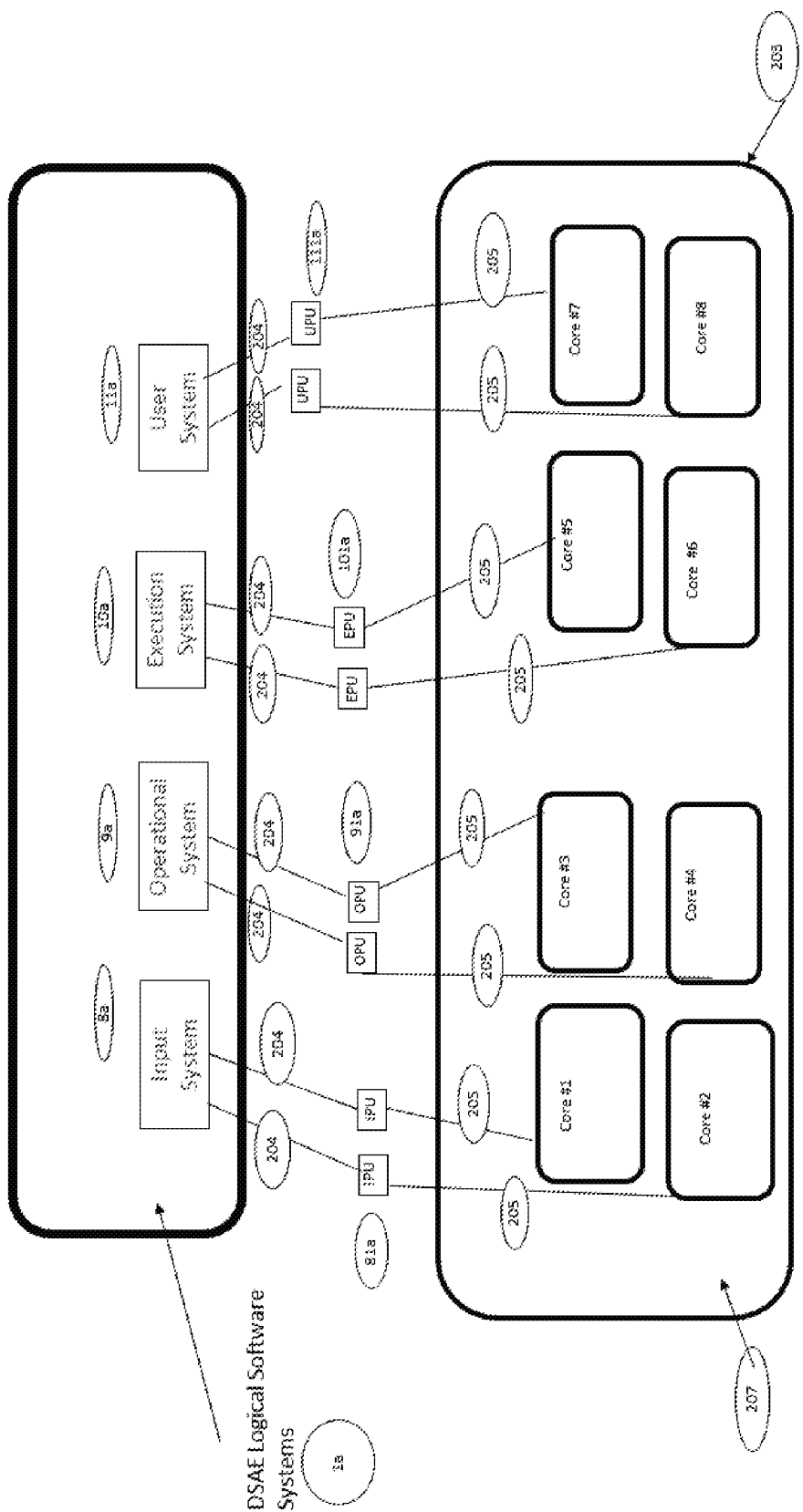
FIG. 11 illustrates an example embodiment of the DSAE implemented with an integrated circuit/processor residing in an endpoint, wherein the endpoint has eight hardware cores, can contain software emulated processor core instruction sets or non-emulated hardware processor core instruction sets, and wherein the cores share a common power source.

Referring now to FIG. 11, an example embodiment of the DSAE is shown as implemented with an integrated circuit/processor residing in an endpoint, wherein the endpoint has eight hardware cores, can contain software emulated processor core instruction sets or non-emulated hardware processor core instruction sets, and wherein the hardware cores share a common power source.

As shown in FIG. 11, eight hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). In addition, eight or more cores also allow for the individual hardware processor cores (Core 1, Core 2, Core 3, Core 4, Core 5, Core 6, Core 7, or Core 8) to have a shared power source supplied to each individual core. After eight hardware cores, multiples of four cores being added (12, 16, 20, 24, 28, 32, 36, 40, 44, 48, 52, 56, etc.) would also yield very useful DSAE configurations, if each core is assigned to a different DSAE processing unit (IPU, OPU, EPU, UPU) and logic DSAE system (Input System, Operational System, Execution System, and User System).

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 11, each hardware core does not have its own, independent power source. Rather, a common power source is shared for all cores, which is not an optimal embodiment of the DSAE security architecture in a circuit. Power sourcing can be important so that the DSAE security architecture integrated circuit implementation can maximize availability.

In FIG. 11, lines 205 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 11, lines 204 map a DSAE processing unit (81a, 91a, 101a, or 111a) to a corresponding DSAE logic system (8a, 9a, 10a, or 11a).

Figure 12:
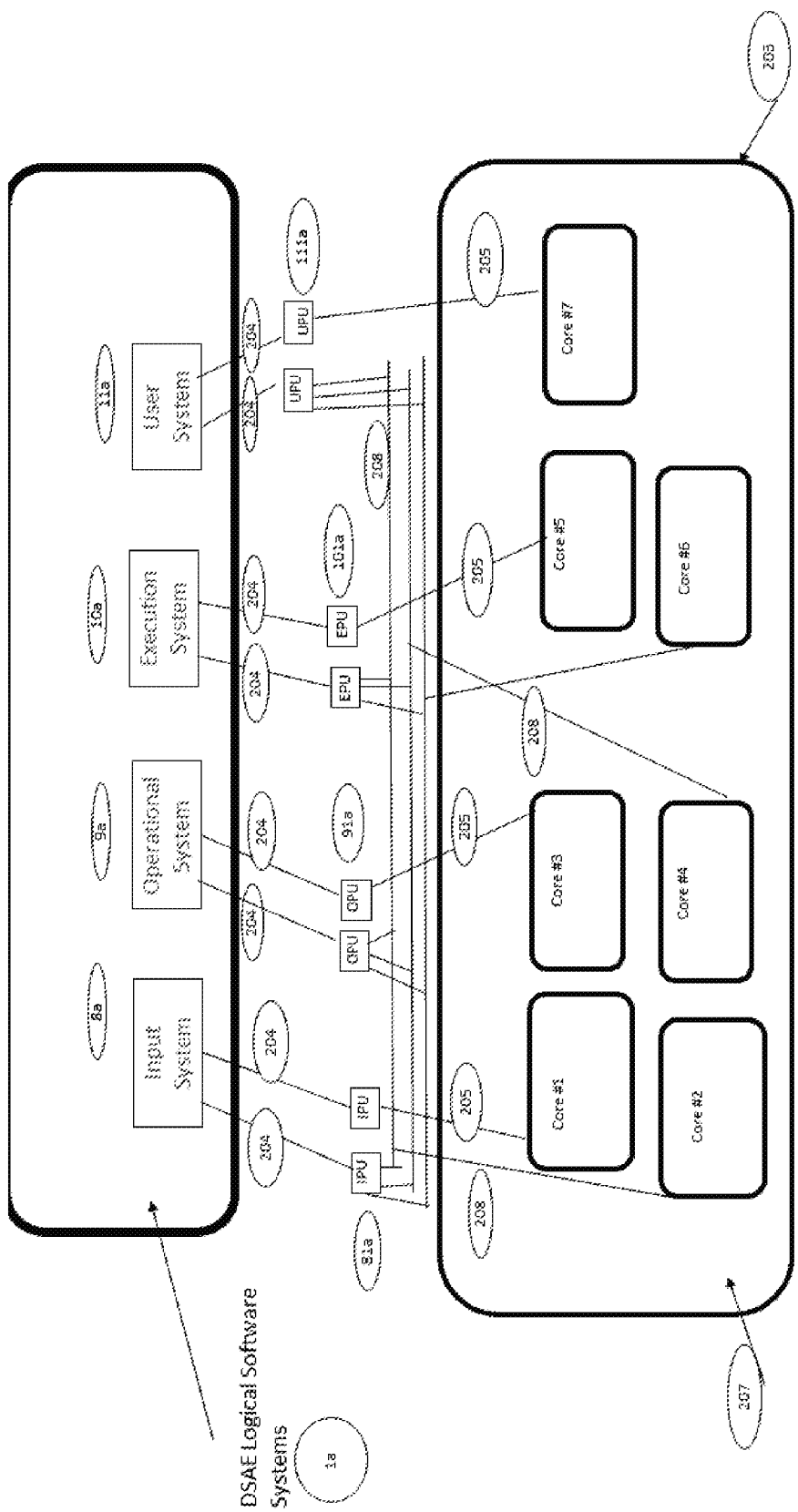
FIG. 12 illustrates an example embodiment of the DSAE implemented with an integrated circuit/processor residing in an endpoint, wherein the endpoint has seven hardware cores, can contain software emulated processor core instruction sets or non-emulated hardware processor core instruction sets, wherein the cores share a common power source, one or more cores monitor the security system, and a virtual processing unit is included, one or more cores monitor the security system, and a virtual processing unit is included.

Referring now to FIG. 12, an example embodiment of the DSAE is shown as implemented with an integrated circuit/processor residing in an endpoint, wherein the endpoint has seven hardware cores, can contain software emulated processor core instruction sets or non-emulated hardware processor core instruction sets, wherein the cores share a common power source, one or more cores monitor the security system, and a virtual processing unit is included. This is a plausible implementation of the DSAE security architecture implemented in a circuit packaging (203). It is not as efficient as an eight hardware core implementation of the DSAE security architecture on a circuit; yet, it is still a very useful implementation of the DSAE security architecture in a circuit.

As shown in FIG. 12, seven hardware processor cores provide the ability for individual, isolated hardware cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). After seven cores, multiples of four cores being added (11, 15, 19, 23, 27, 31, 35, 39, 43, 47, 51, 55, etc.) would also yield very useful DSAE configurations by assigning Core 1, Core 3, Core 5, and Core 7 into a different DSAE processing unit (IPU, OPU, EPU, UPU) and logic DSAE system (Input System, Operational System, Execution System, and User System). Then, the remaining cores (Core 2, Core 4, and Core 6) can monitor each DSAE logic system (8a, 9a, 10a, and 11a) via software running on the core and using a hardware path 208 into each required DSAE processing unit (208 represents the hardware path, the heartbeat monitoring software and a software emulated processor core or a non-emulated hardware processor core). As a result, the remaining cores can become a full, dedicated IPU, OPU, EPU or UPU for the corresponding DSAE logic system as needed/determined by the monitoring software running on the remaining cores.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 12, each hardware core does not have its own, independent power source (207). Rather, a common power source is shared for all cores, which is not an optimal embodiment of the DSAE security architecture in a circuit. Power sourcing can be important so that the DSAE security architecture integrated circuit implementation can maximize availability.

In FIG. 12, lines 205 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 12, lines 204 map a DSAE processing unit (81a, 91a, 101a, or 111a) to a corresponding DSAE logic system (8a, 9a, 10a, or 11a).

Figure 13:
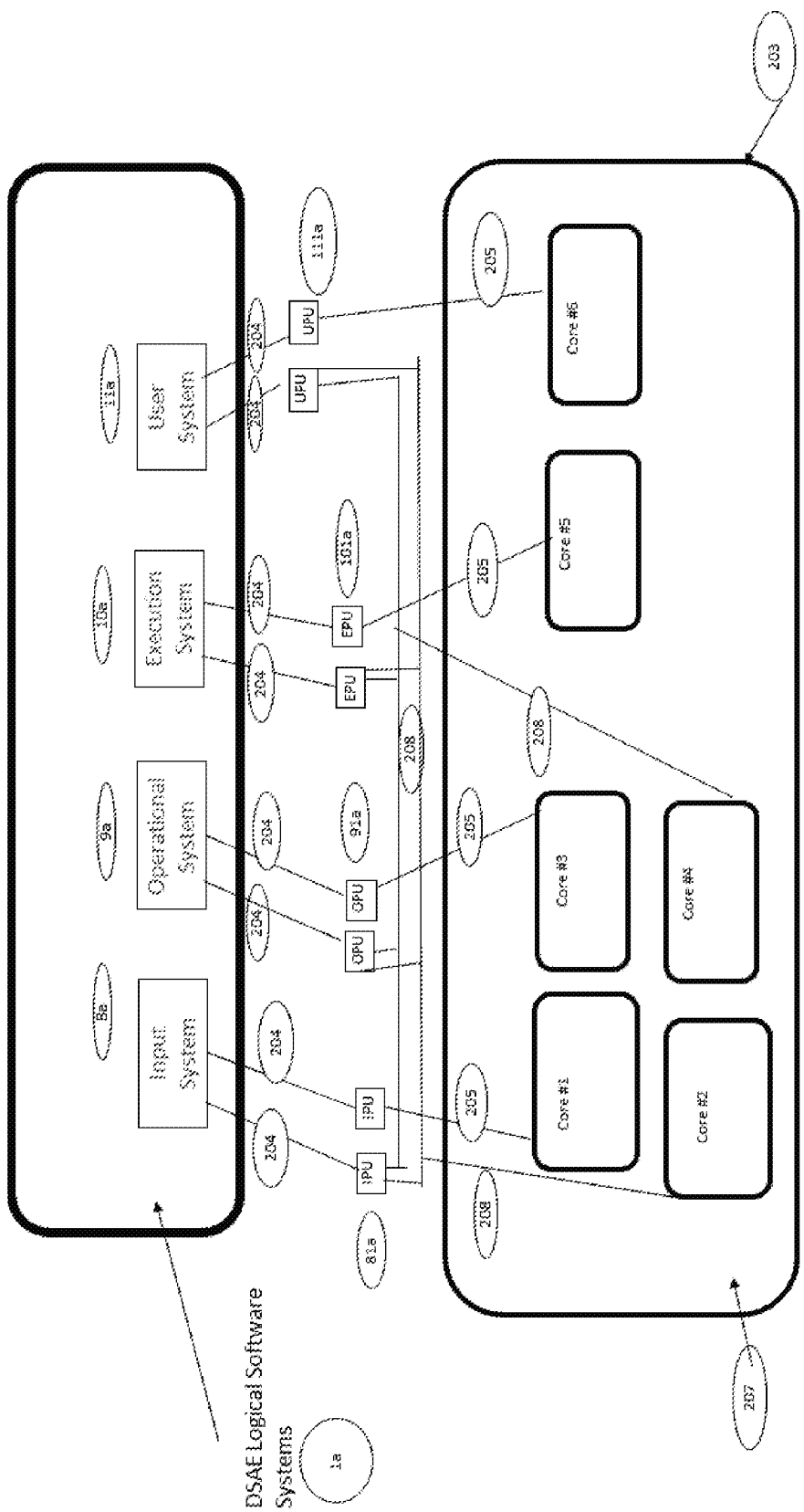
FIG. 13 illustrates an example embodiment of the DSAE implemented with an integrated circuit/processor residing in an endpoint, wherein the endpoint has six hardware cores, can contain software emulated processor core instruction sets or non-emulated hardware processor core instruction sets, wherein the cores share a common power source, one or more cores monitor the security system, and a virtual processing unit is included.

Referring now to FIG. 13, an example embodiment of the DSAE is shown as implemented with an integrated circuit/processor residing in an endpoint, wherein the endpoint has six hardware cores, can contain software emulated processor core instruction sets or non-emulated hardware processor core instruction sets, wherein the cores share a common power source, one or more cores monitor the security system, and a virtual processing unit is included. This is a plausible implementation of the DSAE security architecture implemented in a circuit packaging (203). It is not as efficient as an eight-hardware-core implementation of the DSAE security architecture on a circuit; yet, it is still a very useful DSAE implementation to the security DSAE security architecture in a circuit.

As shown in FIG. 13, six hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). After six cores, multiples of four cores being added (10, 14, 18, 22, 26, 30, 34, 38, 42, 46, 50, 54, etc.) would also yield very useful DSAE configurations by assigning Core 1, Core 3, Core 5 and Core 7 into a different DSAE processing unit (IPU, OPU, EPU, UPU) and logic DSAE system (Input System, Operational System, Execution System, and User System). Then, the remaining cores (Core 2 and Core 4) can monitor each DSAE logic system (8a, 9a, 10a and 11a) via software running on the core and using a hardware path 208 into each required DSAE processing unit (208 represents the hardware path the heartbeat monitoring software, and a software emulated processor core or a non-emulated hardware processor core). As a result, the remaining cores can become a full, dedicated IPU, OPU, EPU or UPU for the corresponding DSAE logic system as needed/determined by the monitoring software running on the remaining core.

Inside the circuit packaging (203), the processor cores contain different processor instruction sets for the cores, such as: i386, x86 64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 13, each hardware core does not have its own, independent power source (207). Rather, a common power source is shared for all cores, which is not an optimal embodiment of the DSAE security architecture in a circuit. Power sourcing can be important so that the DSAE security architecture integrated circuit implementation can maximize availability.

In FIG. 13, lines 205 represent paths from a physical core to a DSAE processor unit (81a, 91a, 101a, or 111a) (and a software emulated processor core or a non-emulated hardware processor core), which map into a DSAE logic system (8a, 9a, 10a, or 11a). In FIG. 13, lines 204 map a DSAE processing unit (81a, 91a, 101a, or 111a) to a corresponding DSAE logic system (8a, 9a, 10a, or 11a).

Figure 14:
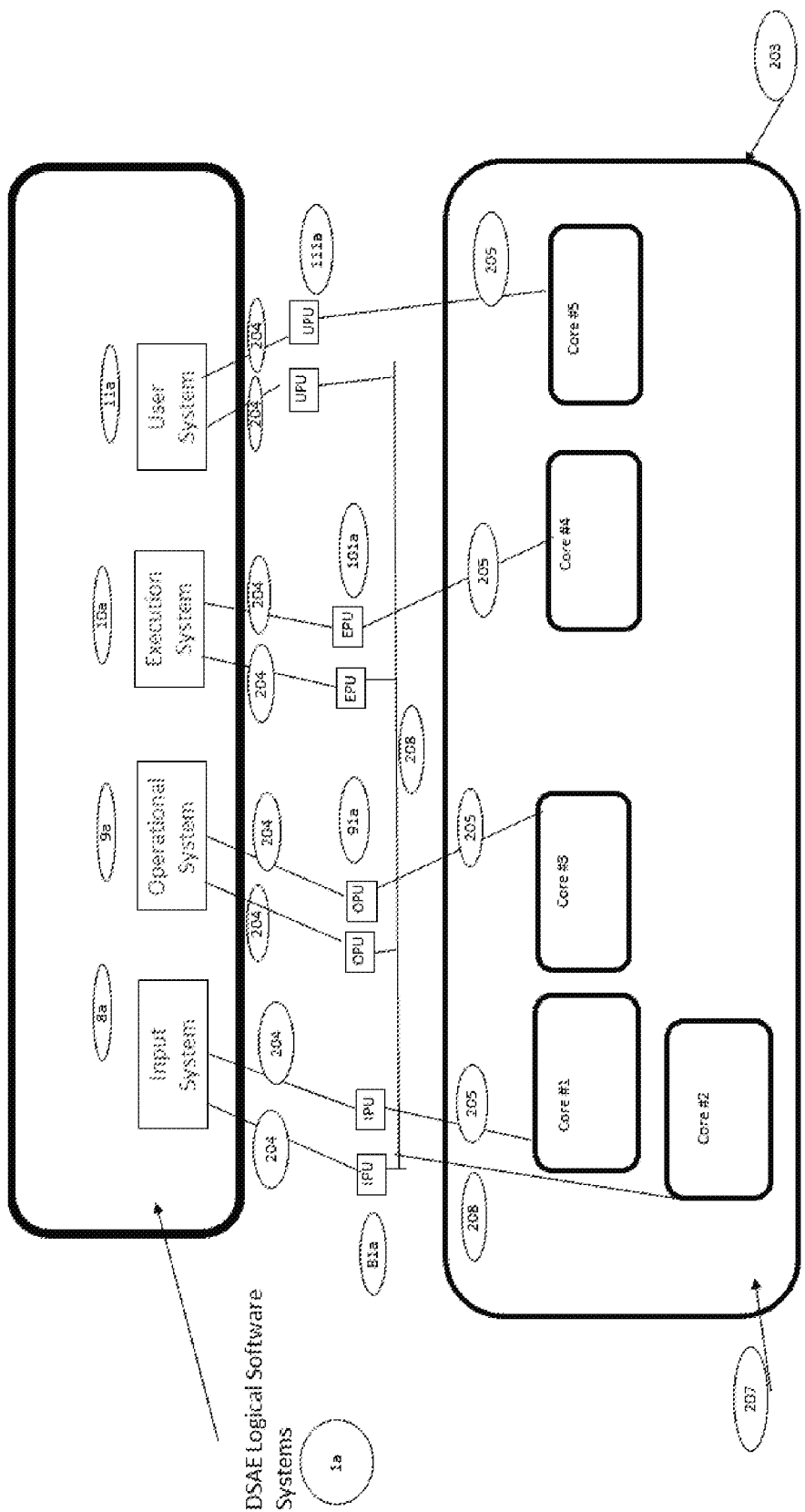
FIG. 14 illustrates an example embodiment of the DSAE implemented with an integrated circuit/processor residing in an endpoint, wherein the endpoint has five hardware cores, can contain software emulated processor core instruction sets or non-emulated hardware processor core instruction sets, wherein the cores share a common power source, one or more cores monitor the security system, and a virtual processing unit is included.

Referring now to FIG. 14, an example embodiment of the DSAE is shown as implemented with an integrated circuit/processor residing in an endpoint, wherein the endpoint has five hardware cores, can contain software emulated processor core instruction sets or non-emulated hardware processor core instruction sets, wherein the hardware cores share a common power source, one or more cores monitor the security system, and a virtual processing unit is included. This is a plausible implementation of the DSAE security architecture implemented in a circuit packaging (203). It is not as efficient as an eight hardware core implementation of the DSAE security architecture on a circuit, yet is still a very useful DSAE implementation to the security DSAE security architecture in a circuit.

As shown in FIG. 14, five hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). After five cores, multiples of four cores being added (9, 13, 17, 21, 25, 29, 33, 37, 41, 45, 49, 53, etc.) would also yield very useful DSAE configurations by assigning Core 1, Core 3, Core 4, and Core 5 into a different DSAE processing unit (IPU, OPU, EPU, UPU) and logic DSAE system (Input System, Operational System, Execution System and User System). Then, the remaining core (Core 2) can monitor each DSAE logic system (8a, 9a, 10a and 11a) via software running on the core and using a hardware path 208 into each required DSAE processing unit (208 represents the hardware path, the heartbeat monitoring software and a software emulated processor core instruction set or a non-emulated hardware processor core instruction set). As a result, the remaining core can become a full, dedicated IPU, OPU, EPU or UPU for the corresponding DSAE logic system as needed/determined by the monitoring software running on the remaining core.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 14, each hardware core does not have its own, independent power source (207). Rather, a common power source is shared for all cores, which is not an optimal embodiment of the DSAE security architecture in a circuit. Power sourcing can be important so that the DSAE security architecture integrated circuit implementation can maximize availability.

In FIG. 14, lines 205 represent paths from a physical core to a DSAE processor unit (81a, 91a, 101a, or 111a) (and a software emulated processor core instruction set or a non-emulated hardware processor core instruction set), which map into a DSAE logic system (8a, 9a, 10a, or 11a). In FIG. 14, lines 204 map a DSAE processing unit (81a, 91a, 101a, or 111a) to a corresponding DSAE logic system (8a, 9a, 10a, or 11a).

Figure 15:
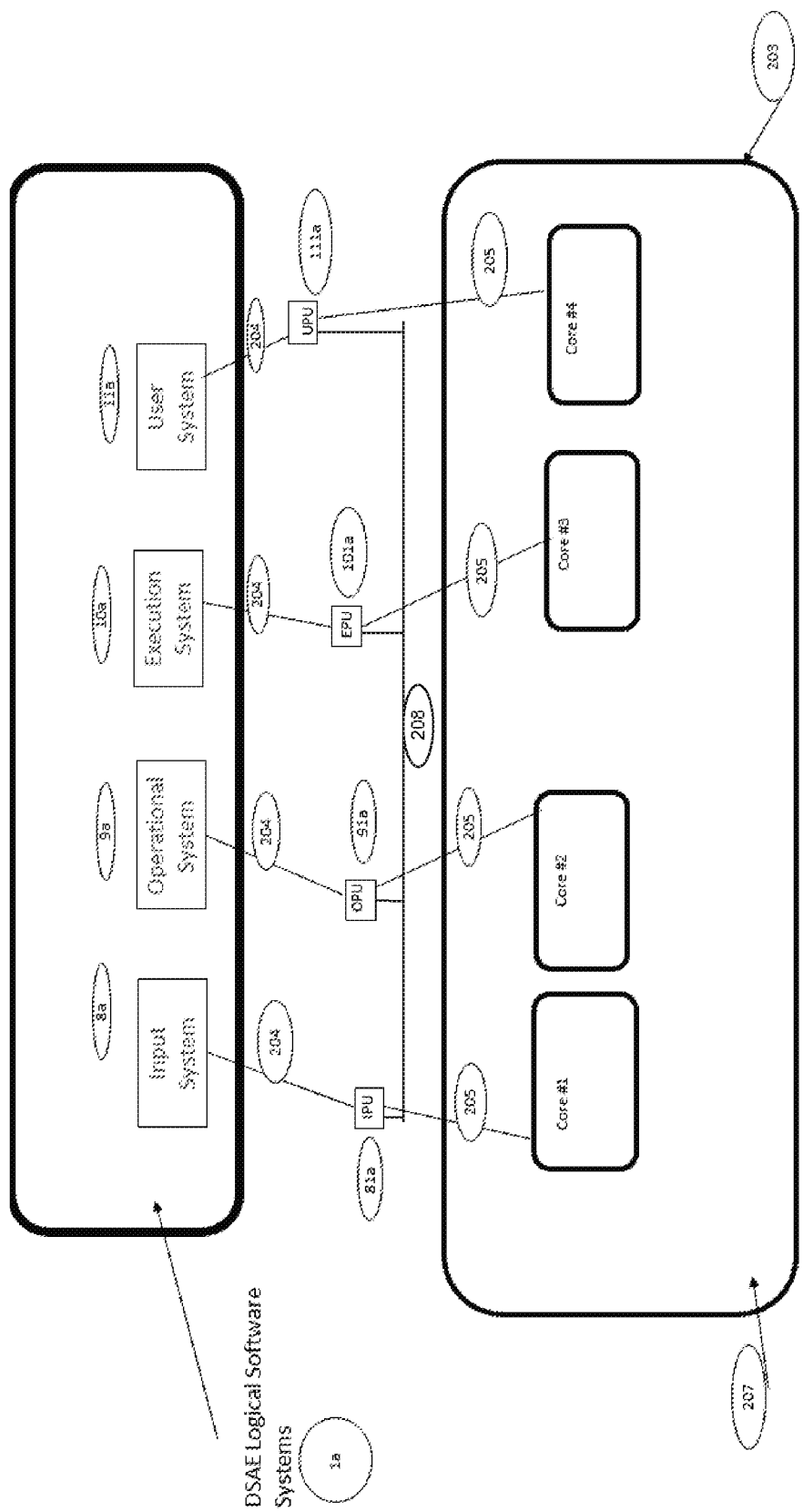
FIG. 15 illustrates an example embodiment of the DSAE implemented with an integrated circuit/processor residing in an endpoint, wherein the endpoint has four hardware cores, can contain software emulated processor core instruction sets or non-emulated hardware processor core instruction sets and wherein the cores share a common power source.

Referring now to FIG. 15, an example embodiment of the DSAE is shown as implemented with an integrated circuit/processor residing in an endpoint, wherein the endpoint has four hardware cores, can contain software emulated processor core instruction sets or non-emulated hardware processor core instruction sets, and wherein the cores share a common power source. This is a plausible implementation of the DSAE security architecture implemented in a circuit packaging (203) and is the minimum number of cores, four, recommended for implementation of the DSAE security architecture in a circuit.

As shown in FIG. 15, four hardware processor cores provide the ability for individual, hardware isolated cores to support the individual processing units that comprise the various processing units of the DSAE security architecture, including: Input Processing Unit (81a), Operational Processing Unit (91a), Execution Processing Unit (101a), and User Processing Unit (111a). The DSAE processing units support the DSAE logic systems (1a), including: Input System (8a), Operational System (9a), Execution System (10a), and User System (11a). After four hardware cores, multiples of four cores being added (8, 12, 16, 20, 24, 28, 32, 36, 40, 44, 48, 52, etc.) would also yield very useful DSAE configurations by assigning Core 1, Core 2, Core 3 and Core 4 into a different DSAE processing unit (IPU, OPU, EPU, UPU) and logic DSAE system (Input System, Operational System, Execution System and User System). Then, the cores (Core 1, Core 2, Core 3, and Core 4) can monitor each DSAE logic system (8a, 9a, 10a and 11a) via software running on the core and using a hardware path 208 into each required DSAE processing unit (208 represents the hardware path, the heartbeat monitoring software and a software emulated processor core instruction set or a non-emulated hardware processor core instruction set). As a result, the remaining cores can become a full, dedicated IPU, OPU, EPU or UPU for the corresponding DSAE logic system as needed/determined by the monitoring software running on the remaining core in parallel to its own processing unit (IPU, OPU, EPU or UPU). This is not a preferred implementation or configuration of the DSAE security architecture on a circuit.

Inside the circuit packaging (203), the processor cores contain different processor instruction sets for the cores, such as: i386, x86_64, MIPS, MIPS32, MIPS64, ARM, ARM7, ARM8, ARM9, PPC, etc. In preferred embodiments, each core instruction set is different and preferably hardware based in each processor unit (IPU, OPU, EPU and UPU) associated with each DSAE logic system (Input System, Operational System, Execution System, and User System) yielding different core instruction sets in each processing unit; yet, core instruction sets could also be emulated in software (e.g., a hardware x86_64 core can emulate an ARM7 processor core instruction set in software emulation) in other configurations as well.

In the embodiment shown in FIG. 15, each hardware core does not have its own, independent power source. Rather, a common power source (207) is shared for all cores, which is not an optimal embodiment of the DSAE security architecture in a circuit. Power sourcing can be important so that the DSAE security architecture integrated circuit implementation can maximize availability.

In FIG. 15, lines 205 represent paths from a physical core to a DSAE processor unit (81a, 91a, 101a, or 111a) (and a software emulated processor core instruction set or a non-emulated hardware processor core instruction set), which map into a DSAE logic system (8a, 9a, 10a, or 11a). In FIG. 15, lines 204 map a DSAE processing unit (81a, 91a, 101a, or 111a) to a corresponding DSAE logic system (8a, 9a, 10a, or 11a).

Implementations of the DSAE architecture in a processor/circuit/system on a chip, can also have embodiments that do not have a virtual processing unit for non-preferred implementations, yet is not recommended. In addition, virtual processing units can be software based, yet that is not recommended and is not a preferred embodiment. In FIG. 1-15, virtual processing units, in addition to a core, use components referenced by 208, 209 and 210.

Thus, systems and methods for providing security to an integrated circuit/processor and the processor cores in an endpoint device using a dynamic security architecture environment (DSAE) are disclosed. Although described with reference to embodiments, it should be readily apparent to those of ordinary skill in the art that various changes, modifications and substitutes are intended within the form and details thereof, without departing from the intended spirit and scope. Accordingly, it will be appreciated that in numerous instances some features will be employed without a corresponding use of other features. Further, those skilled in the art will understand that variations can be made in the number and arrangement of components illustrated in the above figures.

What is claimed is:

1. A method for providing security to an integrated circuit of a host endpoint device, the method comprising:
providing a security system configured for integration with the integrated circuit of the host endpoint device to enable the security system to protect the host endpoint device from malicious attacks, the integrated circuit of the host endpoint device having at least one physical Processor Packing Unit (PPU) including a plurality of different processor cores, the PPU being configured to use different processor instruction sets, the security system and a host interface being internal to the integrated circuit and in data communication with the PPU, the security system having a processing unit including an Operational Processing Unit (OPU), an Input Processing Unit (IPU), and an Execution Processing Unit (EPU), the security system further including logic modules in communication with the processing unit, the logic modules including an Input System, an Operational System, and an Execution System, the host interface being configured to enable the Input System, the Operational System, and the Execution System to be coupled for data and control transmissions therebetween and coupled for data and control transmissions between the processing unit and the PPU; and
configuring the Input System, the Operational System, and the Execution System to present a different attack surface at different intervals within a period of time for the PPU, each different attack surface corresponding to the PPU executing a different processor instruction set on the plurality of different processor cores.

2. The method of claim 1 wherein the PPU includes eight processor cores.

3. The method of claim 1 wherein each processor core has its own independent power source.

4. The method of claim 1 wherein each processor core shares a common power source.

5. The method of claim 1 wherein a processor core of the PPU serves as a virtual processing unit.

6. The method of claim 1 including configuring the OPU, the IPU, and the EPU as independent, isolated hardware units, and configuring the Input System, the Operational System, and the Execution System as independent, isolated software logical systems to present a different attack surface at a supply-chain level for an electronic device product to combat electronic device supply-chain attacks.

7. The method of claim 1 including mapping the processing unit to the Input System, the Operational System, and the Execution System.

8. The method of claim 1 wherein the logic modules include a User System.

9. The method of claim 1 including creating data communication paths from a physical processor core of the PPU to a processor unit of the security system.

10. The method of claim 1 wherein the PPU includes seven processor cores.

11. The method of claim 1 wherein one or more cores of the PPU monitor the security system.

12. The method of claim 1 wherein the PPU includes a quantity of processor cores from the group consisting of: six, five, four, three, two, and one.

13. The method of claim 1 wherein the PPU includes at least one processor core with software emulation.

14. The method of claim 1 wherein the PPU includes at least one processor core with software emulation, wherein through software emulation, the security system creates multiple emulated cores of different processor architecture types.

15. The method of claim 1 wherein the security system implements a Dynamic Security Architecture Environment (DSAE) security architecture system within the integrated circuit.

16. The method of claim 1 wherein each different attack surface is presented at different intervals by configuring the Execution System to execute different processor instruction sets.

17. The method of claim 1 wherein the PPU includes a quantity of processor cores from the group consisting of: 12, 16, 20, 24, 28, 32, 36, 40, 44, 48, 52, and 56.

18. A security system configured to provide security to a host endpoint device, the security system comprising:
  a processing unit including an Operational Processing Unit (OPU), an Input Processing Unit (IPU), and an Execution Processing Unit (EPU);
  logic modules in communication with the processing unit, the logic modules including an Input System, an Operational System, and an Execution System; and
  a host interface being configured to enable the Input System, the Operational System, and the Execution System to be coupled for data and control transmissions therebetween and coupled for data and control transmissions between the processing unit and a physical Processor Packing Unit (PPU) including a plurality of different processor cores, the PPU being configured to use different processor instruction sets, the Input System, the Operational System, and the Execution System being configured to present a different attack surface at different intervals within a period of time for the PPU, each different attack surface corresponding to the PPU executing a different processor instruction set on the plurality of different processor cores, the processing unit, the logic modules, and the host interface being integrated together with the PPU on an integrated circuit of the host endpoint device.

19. The security system of claim 18 wherein the PPU includes eight processor cores.

20. The security system of claim 18 wherein each processor core has its own independent power source.

21. The security system of claim 18 wherein each processor core shares a common power source.

22. The security system of claim 18 wherein a processor core of the PPU is configured as a virtual processing unit.

23. The security system of claim 18 wherein the OPU, the IPU, and the EPU are configured as independent, isolated hardware units, and the Input System, the Operational System, and the Execution System are configured as independent, isolated software logical systems to present a different attack surface at a supply-chain level for an electronic device product to combat electronic device supply-chain attacks.

24. The security system of claim 18 being configured to map the processing unit to the Input System, the Operational System, and the Execution System.

25. The security system of claim 18 wherein the logic modules include a User System.

26. The security system of claim 18 being configured to create data communication paths from a physical processor core of the PPU to a processor unit of the security system.

27. The security system of claim 18 wherein the PPU includes seven processor cores.

28. The security system of claim 18 wherein one or more cores of the PPU are configured to monitor the security system.

29. The security system of claim 18 wherein the PPU includes a quantity of processor cores from the group consisting of: six, five, four, three, two, and one.

30. The security system of claim 18 wherein the PPU includes at least one processor core with software emulation.

31. The security system of claim 18 wherein the PPU includes at least one processor core with software emulation, wherein through software emulation, the security system creates multiple emulated cores of different processor architecture types.

32. The security system of claim 18 wherein the security system is configured to implement a Dynamic Security Architecture Environment (DSAE) security architecture system within the integrated circuit.

33. The security system of claim 18 wherein each different attack surface is presented at different intervals by configuring the Execution System to execute different processor instruction sets.

34. The security system of claim 18 wherein the PPU includes a quantity of processor cores from the group consisting of: 12, 16, 20, 24, 28, 32, 36, 40, 44, 48, 52, and 56.

35. A method for providing security to an electronic device of a host endpoint device, the method comprising:
  providing a security system configured for integration with the electronic device of the host endpoint device to enable the security system to protect the host endpoint device from malicious attacks, the electronic device of the host endpoint device having at least one physical Processor Packing Unit (PPU) including a plurality of different processor cores, the PPU being configured to use different processor instruction sets, the security system having a host interface in data communication with the PPU, the security system having a processing unit including an Operational Processing Unit (OPU), an Input Processing Unit (IPU), and an Execution Processing Unit (EPU), the security system further including logic modules in communication with the processing unit, the logic modules including an Input System, an Operational System, and an Execution System, the host interface being configured to enable the Input System, the Operational System, and the Execution System to be coupled for data and control transmissions therebetween and coupled for data and control transmissions between the processing unit and the PPU; and configuring the Input System, the Operational System, and the Execution System to present a different attack surface at different intervals within a period of time for the electronic device, each different attack surface corresponding to the electronic device executing a different processor instruction set on the plurality of different processor cores.

36. The method of claim 35 wherein the OPU, the IPU, and the EPU are configured as independent, isolated hardware units, and the Input System, the Operational System, and the Execution System are configured as independent, isolated software logical systems to present a different attack surface at a supply-chain level for an electronic device product to combat electronic device supply-chain attacks.

\* \* \* \* \*